(12) United States Patent
Miner et al.

(10) Patent No.: US 7,853,890 B2
(45) Date of Patent: *Dec. 14, 2010

(54) ADDRESS BAR USER INTERFACE CONTROL

(75) Inventors: Patrice L. Miner, Kirkland, WA (US);
Zeke Odins-Lucas, Bellevue, WA (US);
David G. De Vorchik, Seattle, WA (US);
Charles Cummins, Seattle, WA (US);
Paul A. Gusmorino, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1070 days.

This patent is subject to a terminal disclaimer.

(21) Appl. No.: 11/111,973

(22) Filed: Apr. 22, 2005

(65) Prior Publication Data

US 2005/0246648 A1 Nov. 3, 2005

Related U.S. Application Data

(63) Continuation-in-part of application No. 10/420,040, filed on Apr. 17, 2003, now Pat. No. 7,240,292.

(51) Int. Cl.
*G06F 15/00* (2006.01)
*G06F 13/00* (2006.01)
(52) U.S. Cl. ....................... 715/778; 715/751
(58) Field of Classification Search ................ 715/810, 715/855, 829, 847, 853–854, 828, 751–759, 715/778–779, 782–783, 792–796, 800, 764
See application file for complete search history.

(56) References Cited

U.S. PATENT DOCUMENTS 4,438,505 A 3/1984 Yanagiuchi
4,829,423 A 5/1989 Tennant et al.
4,881,179 A 11/1989 Vincent (Continued)

FOREIGN PATENT DOCUMENTS

CN 1421800 11/2001

(Continued)

OTHER PUBLICATIONS

Grosky, et al., "Using Metadata for Intelligent Browsing of Structured Media Objects", Dec. 1994, Sigmond Record, vol. 23, No. 4, pp. 49-56.

(Continued)

*Primary Examiner*—Cao "Kevin" Nguyen
(74) *Attorney, Agent, or Firm*—Shook, Hardy & Bacon, L.L.P.

(57) ABSTRACT

An address bar user interface control includes a plurality of interactive segments, each segment including one or more filters or selection criteria for selecting content from physical and/or virtual locations. A segment may include two or more filters or selection criteria which are logically combined such as by a logical "OR" operation. A user may select a child control associated with an interactive segment, i.e., a parent segment, to provide a list of selectable child filters or selection criteria. In response to selection of a child filter or selection criteria, an interactive segment representing the child filter or selection criteria is added to the address bar succeeding the parent segment and the interactive segments subsequent to the parent segment are removed.

14 Claims, 14 Drawing Sheets

U.S. PATENT DOCUMENTS

| | | | |
|---|---|---|---|
| 4,931,935 A | 6/1990 | Ohira | |
| 5,060,135 A | 10/1991 | Levine et al. | |
| 5,241,671 A | 8/1993 | Reed et al. | |
| 5,297,250 A | 3/1994 | Leroy et al. | |
| 5,327,529 A | 7/1994 | Fults | |
| 5,333,266 A | 7/1994 | Boaz et al. | |
| 5,333,315 A | 7/1994 | Saether et al. | |
| 5,388,196 A | 2/1995 | Pajak et al. | |
| 5,420,605 A | 5/1995 | Vouri | |
| 5,461,710 A | 10/1995 | Bloomfield et al. | |
| 5,499,364 A | 3/1996 | Klein et al. | |
| 5,504,852 A | 4/1996 | Thompson-Rohrlich | |
| 5,513,306 A | 4/1996 | Mills et al. | |
| 5,544,360 A | 8/1996 | Lewak et al. | |
| 5,546,527 A | 8/1996 | Fitzpatrick et al. | |
| 5,550,852 A | 8/1996 | Patel et al. | |
| 5,559,948 A | 9/1996 | Bloomfield et al. | |
| 5,583,982 A | 12/1996 | Matheny et al. | |
| 5,590,259 A | 12/1996 | Anderson et al. | |
| 5,596,702 A | 1/1997 | Stucka | |
| 5,598,524 A | 1/1997 | Johnston, Jr. et al. | |
| 5,600,778 A | 2/1997 | Swanson et al. | |
| 5,606,669 A | 2/1997 | Bertin et al. | |
| 5,625,783 A | 4/1997 | Ezekiel | |
| 5,630,042 A | 5/1997 | McIntosh et al. | |
| 5,648,795 A | 7/1997 | Vouri | |
| 5,652,876 A | 7/1997 | Ashe | |
| 5,675,520 A | 10/1997 | Pitt | |
| 5,675,663 A | 10/1997 | Koerner et al. | |
| 5,680,563 A | 10/1997 | Edelman | |
| 5,696,486 A | 12/1997 | Poliquin et al. | |
| 5,696,914 A | 12/1997 | Nahaboo | |
| 5,710,926 A | 1/1998 | Maurer | |
| 5,757,925 A | 5/1998 | Faybishenko | |
| 5,760,770 A | 6/1998 | Bliss | |
| 5,790,121 A | 8/1998 | Sklar et al. | |
| 5,802,516 A | 9/1998 | Shwarts et al. | |
| 5,831,606 A | 11/1998 | Nakajima et al. | |
| 5,835,094 A | 11/1998 | Ermel et al. | |
| 5,838,317 A | 11/1998 | Bolnick et al. | |
| 5,838,322 A | 11/1998 | Nakajima et al. | |
| 5,855,446 A | 1/1999 | Disborg | |
| 5,864,844 A | 1/1999 | James et al. | |
| 5,867,163 A | 2/1999 | Kurtenbach | |
| 5,870,088 A | 2/1999 | Washington | |
| 5,875,446 A | 2/1999 | Brown et al. | |
| 5,878,410 A | 3/1999 | Zbikowski et al. | |
| 5,886,694 A | 3/1999 | Breinberg et al. | |
| 5,898,995 A | 5/1999 | Ghodbane | |
| 5,899,995 A | 5/1999 | Millier et al. | |
| 5,905,973 A | 5/1999 | Yonezawa et al. | |
| 5,907,703 A | 5/1999 | Kronenberg | |
| 5,907,837 A | 5/1999 | Ferrel et al. | |
| 5,909,540 A | 6/1999 | Carter et al. | |
| 5,923,328 A | 7/1999 | Griesmer | |
| 5,924,090 A | 7/1999 | Krellenstein | |
| 5,929,854 A | 7/1999 | Ross | |
| 5,930,801 A | 7/1999 | Falkenhainer | |
| 5,933,139 A | 8/1999 | Feigner et al. | |
| 5,935,210 A | 8/1999 | Stark | |
| 5,973,686 A | 10/1999 | Shimogori | |
| 5,987,454 A | 11/1999 | Hobbs | |
| 5,987,506 A | 11/1999 | Carter et al. | |
| 6,003,040 A | 12/1999 | Mital et al. | |
| 6,008,806 A | 12/1999 | Nakajima et al. | |
| 6,014,137 A | 1/2000 | Burns | |
| 6,016,692 A | 1/2000 | Schaenzer et al. | |
| 6,021,262 A | 2/2000 | Cote et al. | |
| 6,023,708 A | 2/2000 | Mendez et al. | |
| 6,024,843 A | 2/2000 | Anderson | |
| 6,025,843 A | 2/2000 | Sklar | |
| 6,037,944 A | 3/2000 | Hugh | |
| 6,055,540 A | 4/2000 | Snow | |
| 6,055,543 A | 4/2000 | Christensen et al. | |
| 6,061,059 A | 5/2000 | Taylor | |
| 6,061,692 A | 5/2000 | Thomas et al. | |
| 6,061,695 A | 5/2000 | Slivka et al. | |
| 6,065,012 A | 5/2000 | Balsara et al. | |
| 6,078,924 A | 6/2000 | Ainsbury et al. | |
| 6,097,389 A | 8/2000 | Morris et al. | |
| 6,101,509 A | 8/2000 | Hanson | |
| 6,144,968 A | 11/2000 | Zellweger | |
| 6,147,601 A | 11/2000 | Sandelman et al. | |
| 6,160,552 A | 12/2000 | Wilsher | |
| 6,175,364 B1 | 1/2001 | Wong et al. | |
| 6,181,342 B1 | 1/2001 | Niblack | |
| 6,182,068 B1 | 1/2001 | Culliss | |
| 6,202,061 B1 | 3/2001 | Khosla et al. | |
| 6,208,985 B1 | 3/2001 | Krehel | |
| 6,216,122 B1 | 4/2001 | Elson | |
| 6,237,004 B1 | 5/2001 | Dodson et al. | |
| 6,237,011 B1 | 5/2001 | Ferguson et al. | |
| 6,240,407 B1 | 5/2001 | Chang et al. | |
| 6,240,421 B1 | 5/2001 | Stolarz | |
| 6,243,094 B1 | 6/2001 | Sklar | |
| 6,243,724 B1 | 6/2001 | Mander et al. | |
| 6,246,411 B1 | 6/2001 | Strauss | |
| 6,256,031 B1 | 7/2001 | Meijer et al. | |
| 6,268,852 B1 | 7/2001 | Lindhorst et al. | |
| 6,275,829 B1 | 8/2001 | Angiulo et al. | |
| 6,301,586 B1 | 10/2001 | Yang et al. | |
| 6,308,173 B1 | 10/2001 | Glasser et al. | |
| 6,317,142 B1 | 11/2001 | Decoste et al. | |
| 6,324,541 B1 | 11/2001 | de l'Etraz et al. | |
| 6,324,551 B1 | 11/2001 | Lamping et al. | |
| 6,326,953 B1 | 12/2001 | Wana | |
| 6,330,007 B1 | 12/2001 | Isreal | |
| 6,339,767 B1 | 1/2002 | Rivette et al. | |
| 6,341,280 B1 | 1/2002 | Glass et al. | |
| 6,342,907 B1 | 1/2002 | Petty | |
| 6,356,863 B1 | 3/2002 | Sayle | |
| 6,356,915 B1 | 3/2002 | Chtchetkine et al. | |
| 6,363,377 B1 | 3/2002 | Kravets et al. | |
| 6,363,400 B1 | 3/2002 | Chtchetkine et al. | |
| 6,369,840 B1 | 4/2002 | Barnett et al. | |
| 6,377,283 B1 | 4/2002 | Thomas | |
| 6,401,097 B1 | 6/2002 | McCotter et al. | |
| 6,405,265 B1 | 6/2002 | Kronenberg | |
| 6,408,298 B1 | 6/2002 | Van | |
| 6,411,311 B1 | 6/2002 | Rich et al. | |
| 6,425,120 B1 | 7/2002 | Morganelli et al. | |
| 6,425,121 B1 | 7/2002 | Phillips | |
| 6,430,575 B1 | 8/2002 | Dourish et al. | |
| 6,430,835 B1 | 8/2002 | Ranucci et al. | |
| 6,437,807 B1 | 8/2002 | Berquist et al. | |
| 6,438,590 B1 | 8/2002 | Gartner | |
| 6,448,985 B1 | 9/2002 | McNally | |
| 6,453,311 B1 | 9/2002 | Powers, III | |
| 6,453,319 B1 | 9/2002 | Mattis et al. | |
| 6,462,762 B1 | 10/2002 | Ku | |
| 6,466,228 B1 | 10/2002 | Ulrich | |
| 6,466,238 B1 | 10/2002 | Berry et al. | |
| 6,466,932 B1 | 10/2002 | Dennis et al. | |
| 6,470,344 B1 | 10/2002 | Kothuri et al. | |
| 6,473,100 B1 | 10/2002 | Beaumont et al. | |
| 6,480,835 B1 | 11/2002 | Light | |
| 6,483,525 B1 | 11/2002 | Tange | |
| 6,505,233 B1 | 1/2003 | Hanson et al. | |
| 6,513,038 B1 | 1/2003 | Hasegawa et al. | |
| 6,519,612 B1 | 2/2003 | Howard et al. | |
| 6,526,399 B1 | 2/2003 | Coulson et al. | |
| 6,535,229 B1 | 3/2003 | Kraft | |
| 6,535,230 B1 | 3/2003 | Celik | |
| 6,539,399 B1 | 3/2003 | Hazama et al. | |

| Patent No. | Date | Inventor |
|---|---|---|
| 6,544,295 B1 | 4/2003 | Bodnar |
| 6,549,217 B1 | 4/2003 | De Greef et al. |
| 6,549,916 B1 | 4/2003 | Sedlar |
| 6,563,514 B1 | 5/2003 | Samar |
| 6,571,245 B2 | 5/2003 | Huang et al. |
| 6,573,906 B1 | 6/2003 | Harding et al. |
| 6,573,907 B1 | 6/2003 | Madrane |
| 6,583,799 B1 | 6/2003 | Manolis et al. |
| 6,590,585 B1 | 7/2003 | Suzuki et al. |
| 6,606,105 B1 | 8/2003 | Quartetti |
| 6,613,101 B2 | 9/2003 | Mander et al. |
| 6,628,309 B1 | 9/2003 | Dodson et al. |
| 6,636,238 B1 | 10/2003 | Amir et al. |
| 6,636,250 B1 | 10/2003 | Gasser |
| 6,638,313 B1 | 10/2003 | Freeman |
| 6,658,406 B1 | 12/2003 | Mazner et al. |
| 6,662,198 B2 | 12/2003 | Satyanarayanan et al. |
| 6,684,222 B1 | 1/2004 | Cornelius et al. |
| 6,721,760 B1 | 4/2004 | Ono |
| 6,735,623 B1 | 5/2004 | Prust |
| 6,738,770 B2 | 5/2004 | Gorman |
| 6,745,206 B2 | 6/2004 | Mandler et al. |
| 6,745,207 B2 | 6/2004 | Reuter et al. |
| 6,751,611 B2 | 6/2004 | Krupin |
| 6,751,626 B2 | 6/2004 | Brown et al. |
| 6,754,829 B1 | 6/2004 | Butt et al. |
| 6,760,721 B1 | 7/2004 | Chasen |
| 6,760,722 B1 | 7/2004 | Raghunandan |
| 6,762,776 B2 | 7/2004 | Huapaya |
| 6,762,777 B2 | 7/2004 | Carroll |
| 6,763,458 B1 | 7/2004 | Watanabe et al. |
| 6,763,777 B1 | 7/2004 | Rosenberg |
| 6,768,999 B2 | 7/2004 | Prager et al. |
| 6,784,900 B1 | 8/2004 | Dobronsky et al. |
| 6,784,925 B1 | 8/2004 | Tomat et al. |
| 6,795,094 B1 | 9/2004 | Watanabe et al. |
| 6,801,919 B2 | 10/2004 | Hunt et al. |
| 6,803,926 B1 | 10/2004 | Lamb et al. |
| 6,813,474 B2 | 11/2004 | Robinson et al. |
| 6,816,863 B2 | 11/2004 | Bates et al. |
| 6,820,083 B1 | 11/2004 | Nagy et al. |
| 6,823,344 B1 | 11/2004 | Isensee et al. |
| 6,826,443 B2 | 11/2004 | Makinen |
| 6,847,959 B1 | 1/2005 | Arrouye et al. |
| 6,853,391 B2 | 2/2005 | Bates et al. |
| 6,865,568 B2 | 3/2005 | Chau |
| 6,871,348 B1 | 3/2005 | Cooper |
| 6,876,900 B2 | 4/2005 | Takeda et al. |
| 6,876,996 B2 | 4/2005 | Czajkowski et al. |
| 6,880,132 B2 | 4/2005 | Uemura |
| 6,883,009 B2 | 4/2005 | Yoo |
| 6,883,146 B2 | 4/2005 | Prabhu et al. |
| 6,885,860 B2 | 4/2005 | Bahl |
| 6,906,722 B2 | 6/2005 | Hrebejk et al. |
| 6,910,049 B2 | 6/2005 | Fenton et al. |
| 6,922,709 B2 | 7/2005 | Goodman |
| 6,925,608 B1 | 8/2005 | Neale et al. |
| 6,938,207 B1 | 8/2005 | Haynes |
| 6,944,647 B2 | 9/2005 | Shah et al. |
| 6,947,959 B1 | 9/2005 | Gill |
| 6,948,120 B1 | 9/2005 | Delgobbo |
| 6,950,818 B2 | 9/2005 | Dennis et al. |
| 6,950,989 B2 | 9/2005 | Rosenzweig |
| 6,952,714 B2 | 10/2005 | Peart |
| 6,952,724 B2 | 10/2005 | Prust |
| 6,980,993 B2 | 12/2005 | Horvitz et al. |
| 7,010,755 B2 | 3/2006 | Anderson et al. |
| 7,024,427 B2 | 4/2006 | Bobbitt et al. |
| 7,028,262 B2 | 4/2006 | Estrada et al. |
| 7,043,472 B2 | 5/2006 | Aridor et al. |
| 7,047,498 B2 | 5/2006 | Lui |
| 7,051,291 B2 | 5/2006 | Sciammarella et al. |
| 7,062,500 B1 | 6/2006 | Hall et al. |
| 7,062,718 B2 | 6/2006 | Kodosky et al. |
| 7,068,291 B1 | 6/2006 | Roberts et al. |
| 7,100,150 B2 | 8/2006 | Polk |
| 7,106,843 B1 | 9/2006 | Gainsboro |
| 7,139,811 B2 | 11/2006 | Lev Ran et al. |
| 7,149,729 B2 | 12/2006 | Kaasten et al. |
| 7,168,051 B2 | 1/2007 | Robinson et al. |
| 7,194,743 B2 | 3/2007 | Hayton |
| 7,203,948 B2 | 4/2007 | Mukundan et al. |
| 7,216,289 B2 | 5/2007 | Kagle |
| 7,216,301 B2 * | 5/2007 | Moehrle ..................... 715/811 |
| 7,219,302 B1 | 5/2007 | O'Shaughnessy et al. |
| 7,240,292 B2 | 7/2007 | Hally et al. |
| 7,243,334 B1 | 7/2007 | Berger et al. |
| 7,275,063 B2 | 9/2007 | Horn |
| 7,290,245 B2 | 10/2007 | Skjolsvold |
| 7,293,031 B1 | 11/2007 | Dusker et al. |
| 7,383,494 B2 | 6/2008 | Krolczyk et al. |
| 7,409,382 B2 | 8/2008 | Kido |
| 7,415,484 B1 | 8/2008 | Tulkoff et al. |
| 2001/0034733 A1 | 10/2001 | Prompt et al. |
| 2001/0034771 A1 | 10/2001 | Hutsch et al. |
| 2001/0047368 A1 | 11/2001 | Oshinsky et al. |
| 2001/0049675 A1 | 12/2001 | Mandler et al. |
| 2001/0053996 A1 | 12/2001 | Atkinson |
| 2001/0056434 A1 | 12/2001 | Kaplan et al. |
| 2001/0056508 A1 | 12/2001 | Arneson et al. |
| 2002/0010736 A1 | 1/2002 | Marques et al. |
| 2002/0019935 A1 | 2/2002 | Andrew et al. |
| 2002/0021828 A1 | 2/2002 | Papier |
| 2002/0033844 A1 | 3/2002 | Levy et al. |
| 2002/0046209 A1 | 4/2002 | De Bellis |
| 2002/0046232 A1 | 4/2002 | Adams et al. |
| 2002/0046299 A1 | 4/2002 | Lefeber et al. |
| 2002/0049717 A1 | 4/2002 | Routtenberg et al. |
| 2002/0052885 A1 | 5/2002 | Levy |
| 2002/0054167 A1 | 5/2002 | Hugh |
| 2002/0059199 A1 | 5/2002 | Harvey |
| 2002/0062310 A1 | 5/2002 | Marmor et al. |
| 2002/0063734 A1 | 5/2002 | Khalfay et al. |
| 2002/0070965 A1 | 6/2002 | Austin |
| 2002/0075310 A1 | 6/2002 | Prabhu et al. |
| 2002/0075312 A1 | 6/2002 | Amadio et al. |
| 2002/0075330 A1 | 6/2002 | Rosenzweig et al. |
| 2002/0087652 A1 | 7/2002 | Davis et al. |
| 2002/0087740 A1 | 7/2002 | Castanho et al. |
| 2002/0087969 A1 | 7/2002 | Brunheroto et al. |
| 2002/0089540 A1 | 7/2002 | Geier et al. |
| 2002/0091679 A1 | 7/2002 | Wright |
| 2002/0091697 A1 | 7/2002 | Huang et al. |
| 2002/0091739 A1 | 7/2002 | Ferlitsch et al. |
| 2002/0095416 A1 | 7/2002 | Schwols |
| 2002/0097278 A1 | 7/2002 | Mandler et al. |
| 2002/0100039 A1 | 7/2002 | Iatropoulos |
| 2002/0103998 A1 | 8/2002 | DeBruine |
| 2002/0104069 A1 | 8/2002 | Gouge et al. |
| 2002/0107973 A1 | 8/2002 | Lennon et al. |
| 2002/0111942 A1 | 8/2002 | Campbell et al. |
| 2002/0113821 A1 | 8/2002 | Hrebejk et al. |
| 2002/0120505 A1 | 8/2002 | Henkin et al. |
| 2002/0120604 A1 | 8/2002 | Labarge et al. |
| 2002/0120757 A1 | 8/2002 | Sutherland et al. |
| 2002/0129033 A1 | 9/2002 | Hoxie et al. |
| 2002/0138552 A1 | 9/2002 | DeBruine et al. |
| 2002/0138582 A1 | 9/2002 | Chandra et al. |
| 2002/0138744 A1 | 9/2002 | Schleicher et al. |
| 2002/0144155 A1 | 10/2002 | Bate et al. |
| 2002/0149888 A1 | 10/2002 | Motonishi et al. |
| 2002/0152262 A1 | 10/2002 | Arkin et al. |
| 2002/0152267 A1 | 10/2002 | Lennon |
| 2002/0156756 A1 | 10/2002 | Stanley et al. |
| 2002/0156895 A1 | 10/2002 | Brown |
| 2002/0161800 A1 | 10/2002 | Eld et al. |

| | | | | | |
|---|---|---|---|---|---|
| 2002/0163572 A1 | 11/2002 | Center et al. | 2004/0003247 A1 | 1/2004 | Fraser et al. |
| 2002/0169678 A1 | 11/2002 | Chao et al. | 2004/0004638 A1 | 1/2004 | Babaria |
| 2002/0174329 A1 | 11/2002 | Bowler et al. | 2004/0006549 A1 | 1/2004 | Mullins et al. |
| 2002/0181398 A1 | 12/2002 | Szlam | 2004/0008226 A1 | 1/2004 | Manolis et al. |
| 2002/0184357 A1 | 12/2002 | Traversat et al. | 2004/0019584 A1 | 1/2004 | Greening et al. |
| 2002/0188605 A1 | 12/2002 | Adya et al. | 2004/0019655 A1 | 1/2004 | Uemura et al. |
| 2002/0188621 A1 | 12/2002 | Flank et al. | 2004/0019875 A1 | 1/2004 | Welch |
| 2002/0188735 A1 | 12/2002 | Needham et al. | 2004/0030731 A1 | 2/2004 | Iftode et al. |
| 2002/0194252 A1 | 12/2002 | Powers, III | 2004/0044696 A1 | 3/2004 | Frost |
| 2002/0196276 A1 | 12/2002 | Corl et al. | 2004/0044776 A1 | 3/2004 | Larkin |
| 2002/0199061 A1 | 12/2002 | Friedman et al. | 2004/0054674 A1 | 3/2004 | Carpenter et al. |
| 2003/0001964 A1 | 1/2003 | Masukura et al. | 2004/0056894 A1 | 3/2004 | Zaika et al. |
| 2003/0009484 A1 | 1/2003 | Hamanaka et al. | 2004/0056896 A1 | 3/2004 | Doblmayr et al. |
| 2003/0014415 A1 | 1/2003 | Weiss et al. | 2004/0059755 A1 | 3/2004 | Farrington et al. |
| 2003/0018657 A1 | 1/2003 | Monday | 2004/0068524 A1 | 4/2004 | Aboulhosn et al. |
| 2003/0018712 A1 | 1/2003 | Harrow et al. | 2004/0070612 A1 | 4/2004 | Sinclair et al. |
| 2003/0028610 A1 | 2/2003 | Pearson | 2004/0073705 A1 | 4/2004 | Madril, Jr. |
| 2003/0033367 A1 | 2/2003 | Itoh | 2004/0083433 A1 | 4/2004 | Takeya |
| 2003/0037060 A1 | 2/2003 | Kuehnel | 2004/0085581 A1 | 5/2004 | Tonkin |
| 2003/0041178 A1 | 2/2003 | Brouk et al. | 2004/0088374 A1 | 5/2004 | Webb et al. |
| 2003/0046011 A1 | 3/2003 | Friedman | 2004/0091175 A1 | 5/2004 | Beyrouti |
| 2003/0046260 A1 | 3/2003 | Satyanarayanan et al. | 2004/0098370 A1 | 5/2004 | Garland et al. |
| 2003/0063124 A1 | 4/2003 | Melhem et al. | 2004/0098379 A1 | 5/2004 | Huang |
| 2003/0069893 A1 | 4/2003 | Kanai et al. | 2004/0098742 A1 | 5/2004 | Hsieh et al. |
| 2003/0069908 A1 | 4/2003 | Anthony et al. | 2004/0103073 A1 | 5/2004 | Blake et al. |
| 2003/0074356 A1 | 4/2003 | Kaier et al. | 2004/0103280 A1 | 5/2004 | Balfanz et al. |
| 2003/0076322 A1 | 4/2003 | Ouzts et al. | 2004/0105127 A1 | 6/2004 | Cudd et al. |
| 2003/0078918 A1 | 4/2003 | Souvignier et al. | 2004/0117358 A1 | 6/2004 | von Kaenel et al. |
| 2003/0079038 A1 | 4/2003 | Robbin et al. | 2004/0117405 A1 | 6/2004 | Short et al. |
| 2003/0081002 A1 | 5/2003 | De Vorchik et al. | 2004/0128322 A1 | 7/2004 | Nagy |
| 2003/0081007 A1 | 5/2003 | Cyr et al. | 2004/0133572 A1 | 7/2004 | Bailey et al. |
| 2003/0084425 A1 | 5/2003 | Glaser | 2004/0133588 A1 | 7/2004 | Kiessig et al. |
| 2003/0085918 A1 | 5/2003 | Beaumont et al. | 2004/0133845 A1* | 7/2004 | Forstall et al. .............. 715/500 |
| 2003/0093321 A1 | 5/2003 | Bodmer et al. | 2004/0142749 A1 | 7/2004 | Ishimaru et al. |
| 2003/0093531 A1 | 5/2003 | Yeung et al. | 2004/0143349 A1 | 7/2004 | Roberts et al. |
| 2003/0093580 A1 | 5/2003 | Thomas et al. | 2004/0148434 A1 | 7/2004 | Matsubara et al. |
| 2003/0097361 A1 | 5/2003 | Huang et al. | 2004/0153451 A1 | 8/2004 | Phillips et al. |
| 2003/0098881 A1 | 5/2003 | Nolte et al. | 2004/0153968 A1 | 8/2004 | Ching et al. |
| 2003/0098893 A1 | 5/2003 | Makinen et al. | 2004/0167942 A1 | 8/2004 | Oshinsky et al. |
| 2003/0101200 A1 | 5/2003 | Koyama et al. | 2004/0168118 A1 | 8/2004 | Wong |
| 2003/0105745 A1 | 6/2003 | Davidson et al. | 2004/0174396 A1 | 9/2004 | Jobs et al. |
| 2003/0107597 A1 | 6/2003 | Jameson | 2004/0177116 A1 | 9/2004 | McConn et al. |
| 2003/0110188 A1 | 6/2003 | Howard et al. | 2004/0177148 A1 | 9/2004 | Tsimelzon, Jr. |
| 2003/0115218 A1 | 6/2003 | Bobbitt et al. | 2004/0177319 A1 | 9/2004 | Horn |
| 2003/0117403 A1 | 6/2003 | Park et al. | 2004/0181516 A1 | 9/2004 | Ellwanger et al. |
| 2003/0117422 A1 | 6/2003 | Hiyama et al. | 2004/0183824 A1 | 9/2004 | Benson et al. |
| 2003/0120678 A1 | 6/2003 | Hill et al. | 2004/0189704 A1 | 9/2004 | Walsh et al. |
| 2003/0120928 A1 | 6/2003 | Cato et al. | 2004/0189707 A1 | 9/2004 | Moore et al. |
| 2003/0120952 A1 | 6/2003 | Tarbotton et al. | 2004/0193594 A1 | 9/2004 | Moore et al. |
| 2003/0122873 A1 | 7/2003 | Dieberger et al. | 2004/0193599 A1 | 9/2004 | Liu et al. |
| 2003/0126136 A1 | 7/2003 | Omoigui | 2004/0193600 A1 | 9/2004 | Kaasten et al. |
| 2003/0126212 A1 | 7/2003 | Morris et al. | 2004/0193621 A1 | 9/2004 | Moore et al. |
| 2003/0135495 A1 | 7/2003 | Vagnozzi | 2004/0193672 A1 | 9/2004 | Samji et al. |
| 2003/0135513 A1 | 7/2003 | Quinn et al. | 2004/0193673 A1 | 9/2004 | Samji et al. |
| 2003/0135517 A1 | 7/2003 | Kauffman | 2004/0199507 A1 | 10/2004 | Tawa |
| 2003/0135659 A1 | 7/2003 | Bellotti et al. | 2004/0205168 A1 | 10/2004 | Asher |
| 2003/0140115 A1 | 7/2003 | Mehra | 2004/0205625 A1 | 10/2004 | Banatwala et al. |
| 2003/0154185 A1 | 8/2003 | Suzuki et al. | 2004/0205633 A1 | 10/2004 | Martinez et al. |
| 2003/0158855 A1 | 8/2003 | Farnham et al. | 2004/0205698 A1 | 10/2004 | Schliesmann et al. |
| 2003/0177422 A1 | 9/2003 | Tararoukhine et al. | 2004/0215600 A1 | 10/2004 | Aridor et al. |
| 2003/0184587 A1 | 10/2003 | Ording et al. | 2004/0220899 A1 | 11/2004 | Barney et al. |
| 2003/0195950 A1 | 10/2003 | Huang et al. | 2004/0223057 A1 | 11/2004 | Oura et al. |
| 2003/0210281 A1 | 11/2003 | Ellis et al. | 2004/0225650 A1 | 11/2004 | Cooper et al. |
| 2003/0212664 A1 | 11/2003 | Breining | 2004/0230572 A1 | 11/2004 | Omoigui |
| 2003/0212680 A1 | 11/2003 | Bates et al. | 2004/0230599 A1 | 11/2004 | Moore et al. |
| 2003/0212710 A1 | 11/2003 | Guy | 2004/0230917 A1 | 11/2004 | Bales et al. |
| 2003/0222915 A1 | 12/2003 | Marion et al. | 2004/0233235 A1 | 11/2004 | Rubin et al. |
| 2003/0225796 A1 | 12/2003 | Matsubara | 2004/0243597 A1 | 12/2004 | Jensen et al. |
| 2003/0227480 A1 | 12/2003 | Polk | 2004/0249902 A1 | 12/2004 | Tadayon et al. |
| 2003/0227487 A1 | 12/2003 | Hugh | 2004/0255048 A1 | 12/2004 | Ran et al. |
| 2003/0233419 A1 | 12/2003 | Beringer | 2004/0257169 A1 | 12/2004 | Nelson |
| 2004/0001106 A1 | 1/2004 | Deutscher et al. | 2005/0004928 A1 | 1/2005 | Hamer et al. |
| 2004/0002993 A1 | 1/2004 | Toussaint et al. | 2005/0010860 A1 | 1/2005 | Weiss et al. |

| | | | |
|---|---|---|---|
| 2005/0015405 A1 | 1/2005 | Plastina et al. | |
| 2005/0027757 A1 | 2/2005 | Kiessig et al. | |
| 2005/0050470 A1 | 3/2005 | Hudson et al. | |
| 2005/0055306 A1 | 3/2005 | Miller et al. | |
| 2005/0071355 A1 | 3/2005 | Cameron et al. | |
| 2005/0080807 A1 | 4/2005 | Beilinson et al. | |
| 2005/0097477 A1 | 5/2005 | Camara et al. | |
| 2005/0114672 A1 | 5/2005 | Duncan et al. | |
| 2005/0120242 A1 | 6/2005 | Mayer et al. | |
| 2005/0131903 A1 | 6/2005 | Margolus et al. | |
| 2005/0131905 A1 | 6/2005 | Margolus et al. | |
| 2005/0138567 A1 | 6/2005 | Smith et al. | |
| 2005/0149481 A1 | 7/2005 | Hesselink et al. | |
| 2005/0165753 A1 | 7/2005 | Chen et al. | |
| 2005/0166159 A1 | 7/2005 | Mondry et al. | |
| 2005/0166189 A1 | 7/2005 | Ma | |
| 2005/0171947 A1 | 8/2005 | Gautestad | |
| 2005/0192953 A1 | 9/2005 | Neale et al. | |
| 2005/0192966 A1 | 9/2005 | Hilbert et al. | |
| 2005/0207757 A1 | 9/2005 | Okuno | |
| 2005/0243993 A1 | 11/2005 | McKinzie et al. | |
| 2005/0246331 A1 | 11/2005 | De Vorchik et al. | |
| 2005/0246643 A1 | 11/2005 | Gusmorino et al. | |
| 2005/0246664 A1 | 11/2005 | Michelman et al. | |
| 2005/0256909 A1 | 11/2005 | Aboulhosn et al. | |
| 2005/0257169 A1 | 11/2005 | Tu | |
| 2005/0283476 A1 | 12/2005 | Kaasten et al. | |
| 2006/0004692 A1 | 1/2006 | Kaasten et al. | |
| 2006/0020586 A1 | 1/2006 | Prompt et al. | |
| 2006/0036568 A1 | 2/2006 | Moore et al. | |
| 2006/0053066 A1 | 3/2006 | Sherr et al. | |
| 2006/0053388 A1 | 3/2006 | Michelman | |
| 2006/0059204 A1 | 3/2006 | Borthakur | |
| 2006/0080308 A1 | 4/2006 | Carpentier et al. | |
| 2006/0090137 A1 | 4/2006 | Cheng | |
| 2006/0129627 A1 | 6/2006 | Phillips et al. | |
| 2006/0173873 A1 | 8/2006 | Prompt et al. | |
| 2006/0200455 A1 | 9/2006 | Wilson | |
| 2006/0200466 A1 | 9/2006 | Kaasten et al. | |
| 2006/0200832 A1 | 9/2006 | Dutton | |
| 2006/0218122 A1 | 9/2006 | Poston et al. | |
| 2006/0277432 A1 | 12/2006 | Patel et al. | |
| 2007/0129977 A1 | 6/2007 | Forney | |
| 2007/0130170 A1 | 6/2007 | Forney | |
| 2007/0130182 A1 | 6/2007 | Forney | |
| 2007/0168885 A1 | 7/2007 | Muller et al. | |
| 2007/0180432 A1 | 8/2007 | Gassner et al. | |
| 2007/0186183 A1 | 8/2007 | Hudson | |

FOREIGN PATENT DOCUMENTS

| | | |
|---|---|---|
| CN | 1421800 | 6/2003 |
| GB | 2329492 | 3/1999 |
| NO | 20042749 | 8/2004 |
| WO | WO9938092 | 12/1990 |
| WO | WO9322738 | 11/1993 |
| WO | WO9412944 | 6/1994 |
| WO | WO9414281 | 6/1994 |
| WO | 9938092 | 7/1999 |
| WO | WO9949663 | 9/1999 |
| WO | WO0051021 | 2/2000 |
| WO | WO0157867 | 3/2000 |
| WO | WO01163919 | 11/2000 |
| WO | 01/63919 A1 | 8/2001 |
| WO | WO02025420 | 8/2001 |
| WO | WO0167668 | 9/2001 |
| WO | WO 0225420 | 3/2002 |
| WO | WO03001720 | 1/2003 |
| WO | WO2004107151 | 5/2003 |
| WO | WO 2004107151 | 9/2004 |
| WO | WO2004097680 | 11/2004 |

OTHER PUBLICATIONS

International Search Report for PCT/US06/26854 dated Sep. 25, 2007.
Examination Report for New Zealand Patent No. 534665 dated Jul. 27, 2007.
Russian Official Action and English Translation of Official Action for Application No. 2003114526/09 dated May 11, 2007, 7 pages.
McFedries, Paul; "The Complete Idiot's Guide to Windows XP", Table of Contents, Oct. 3, 2001; Alpha Books, Ch. 6: Using My Computer to Fiddle w/h Files and Folder-printed p. 1-6, Finding a File in Mess p. 103.
Adobe, Inc., et al., "Adobe Photoshop CS Classroom in a Book," Dec. 1, 2003, pp. 1-29.
Adobe, Inc., et al., "Adobe Photoshop 7.0", 2001; pp. 1-9.
Heinlein, et al., "Integration of Message Passing and Shared Memory in the Stanford FLASH Multiprocessor, Architectural Support for Programming Languages and Operating Systems," pp. 38-50, published 1994.
Louis, et al., "Context Learning Can Improve User Interaction Information Reuse and Integration," Proceedings of the 2004 IEEE International Conference on, pp. 115-120, Nov. 8-10, 2004.
Langer, Maria, Mac OS X: Visual QuickStart Guide; Apr. 2001, Peachpit Press, Mac OS X Disk Organization (pp. 1-3), Views (pp. 1-11), Outlines (1-3).
Ray, Jay, Mac OS X Unleashed, Nov. 2001, Sams, Chapter 4. The Finder: Working with Files and Applications (pp. 1-15), Getting File Information (pp. 1-7).
Cohen, et al., "A Case for Associative Peer to Peer Overlays"—ACM SIGCOMM Computer Communications Review, vol. 33, No. 1, Jan. 2003, pp. 95-100.
Lui, et al., "Interoperability of Peer-to-Peer File Sharing Protocols"—ACM SIGecom Exchanges, vol. 3, No. 3, Aug. 2002, pp. 25-33.
International Search Report and Written Opinion of PCT/US04/25931 dated Apr. 3, 2007.
Kuchinsky, et al., "FotoFile: A Consumer Multimedia Organization and Retrieval System", May 1999, ACM, pp. 496-503.
Written Opinion of SG 200301764-7 dated Jan. 11, 2007.
Windows Commander (website), <URL: http://www.ghisler.com>, accessed using http://www.archive.org/web/web.php, in particular, http://web.archive.org/web/20030207145141/www.ghisler.com/featurel.htm, archived on Feb. 7, 2003; http://web.archive.org/web/20021017022627/www.ghisler.com/addons.htm, archived on Oct. 17, 2002; http://web.archive.org/web/20021009213316/www.ghisler.com/efaquser.htm, archived on Oct. 9, 2003; unable to access website.
Bott, et al., "Microsoft Windows XP Inside Out", Microsoft Press, 2001, Chapter 11, 39 pages.
Bott, et al., Book titled "Special Edition Using Windows 98, Second Edition", Dec. 21, 1999, second edition, pp. 1-7.
Supplementary European Search Report for EP 04780390 dated Jun. 18, 2007.
Lee, J., "An End-User Perspective on File-Sharing Systems," Communications of the ACM 46(2):49-53, Feb. 2003.
Ohtani, A., et al., "A File Sharing Method For Storing Area Network and Its Performance Verification," NEC Res. & Develop. 44(1):85-90, Jan. 2003.
H. Weinreich, et al., "The Look of the Link—Concepts of the User Interface of Extended Hyperlinks," Proceedings of the Twelfth ACM Conference on Hypertext and Hypermedia, Hypertext '01, Aarhus, Denmark, Aug. 2001, pp. 19-28.
Seltzer, M., et al., "Journaling Versus Soft Updates: Asynchronous Meta-data Protection in File Systems," Proceedings of the 2000 USENIX Technical Conference, San Diego, CA, Jun. 18-23, 2000, pp. 71-84.
R. Rao, et al., "Rich Interaction in the Digital Library," Communications of the ACM 38(4):29-39.1995.

Piernas, J., et al., "DualIFS: A New Journaling File System Without Meta-Data Duplication," Conference Proceedings of the 2002 International Conference on Supercomputing, New York, Jun. 22-26, 2002, p. 137-146.

Manber, U., and S. Wu, "Glimpse: A Tool to Search Through Entire File Systems," Proceedings of USENIX Winter 1994 Conference, San Francisco, Ca, Jan. 17-21, 1994.

Coster, R., and D. Svensson, "Inverted File Search Algorithms for Collaborative Filtering," Proceedings of the 25th Annual International ACM SIGIR Conference on Research and Development in Information Retrieval, Tampere, Finland, Aug. 11-15, 2002.

Gifford, D.K., et al., "Semantic File Systems," Proceedings of the 13th ACM Symposium on Operating Systems Principles, Pacific Grove CA., Sep. 1991, pp. 16-25.

Blair, C., and G.E. Monahan, "Optimal Sequential File Search: A Reduced-State Dynamic Programming Approach," European Journal of Operational Research 86(2):358-365, 1995.

Clay, L.M., et al., Posting Protocol for Improved Keyword Search Success in Peer-to-Peer File Sharing Systems, Proceedings of SPIE-Int. Soc. Opt. Eng., Santa Clara, CA, Jan. 23-24, 2003, vol. 5019, pp. 138-149.

Na, J., and V. Rajaravivarma, "Multimedia File Sharing in Multimedia Home or Office Business Networks," Proceedings of the 35th Southeastern Symposium on System Theory, Morgantown, W. Va., Mar. 16-18, 2003, pp. 237-241.

Kwon G., and K.D. Ryu, "An Efficient Peer-to-Peer File Sharing Exploiting Hierarchy and Asymmetry," Proceedings of the 2003 Symposium on Applications and the Internet, Orlando, Fla., Jan. 27-31, 2003, pp. 226-233.

Qian, J., et al., "ACLA: A Framework for Access Control List (ACL) Analysis and Optimization," Fifth Joint Working Conference on Communications and Multimedia Security, Darnstadt, Germany, May 21-22, 2001, pp. 197-211.

Rao, J.R., "Some Performance Measures of File Sharing on Multiple Computer Systems," Proceedings of the Conference on Modeling and Simulation, vol. 6, Part I, Pittsburgh, Penn., Apr. 24-25, 1976, pp. 527-530.

Reinauer, R., "UNIX System V.# Remote File Sharing Capabilities and Administration," Unisphere 8(6):64-68, Sep. 1988.

Templin, P.J., Jr., "Providing a Centralized File Sharing Resource at Bucknell University", Proceedings of the User Services Conference for College and University Computing Services Organization, Bloomington, Ind., Oct. 25-28, 1998, pp. 289-292.

Yamai, N. et al., "NFS-Based Secure File Sharing Over Multiple Administrative Domains With Minimal Administration," Systems and Computers in Japan 33(14):50-58, Dec. 2002.

Yong Kyu Lee, et al., Metadata Management of the SANtopia File System, Proceedomgs of the 8th International Conference onParallel and Distributed Systems (ICPADS 2001), Kyoungju City, Korea, Jun. 26-29, 2001, pp. 492-499, IEEE Computer Society, 2001, ISBN 0-7695-1153-8.

Horst F. Wedde, et al., A Universal Framework for Managing Metadata in the Distributed Dragon Slayer System, Proceedings of the 26th EUROMICRO Conference (EUROMICRO'00), vol. 2, Maastricht, The Netherlands, Sep. 5-7, 2000, pp. 96-101, IEEE Computer Society, 2000, ISBN 1089-6503.

Jolon Faichney, et al., Goldleaf Hierarchical Document Browser, Second Australian User Interface Conference (AUIC'01), Gold Coast, Queensland, Australia, Jan. 29-Feb. 1, 2001, pp. 13-20, IEEE Computer Society, 2001, ISBN 0-7695-0969-X.

Dino Esposito, New Graphical Interface: Enhance Your Programs with New Windows XP Shell Features, MSDN Magazine, Nov. 2001, vol. 16, No. 11.

Stuart Yeates, et al., Tag Insertion Complexity, Data Compression Conference, (DCC 2001), Snowbird, Utah, USA, Mar. 27-29, 2001,pp. 243-252, IEEE Computer Society2001, ISBN 1068-0314.

Bipin C. Desal, et al., Resource Discovery: Modeling, Cataloguing and Searching, Seventh International Workshop on Database and Expert Systems Applications (DEXA '96), Zurich, Switzerland, Sep. 9-10, 1996, pp. 70-75, IEEE-CS Press, 1996, ISBN 0-8186-7662-0.

Gulrukh Ahanger, et al., Automatic Composition Techniques for Video Production, IEEE Transactions on Knowledge and Data Engineering, Nov./Dec. 1998, pp. 967-987, vol. 10, No. 6, IEEE Computer Society, 1998, ISBN 1041-4347.

Jane Hunter, An Overview of the MPEG-7 Description Language (DDL), IEEE Transactions on Circuits and Systems for Video Technology, Jun. 2001, pp. 765-772, vol. 11, No. 6, IEEE Computer Society, 2001, ISBN 1051-8215.

Philippe Salembier, et al., MPEG-7 Multimedia Description Schemes, IEEE Transactions on Circuits and Systems for Video Technology, Jun. 2001, pp. 748-759, vol. 11, No. 6, IEEE Computer Society, 2001, ISBN 1051-8215.

Thomas Sikora, The MPEG-7 Visual Standard for Content Description—An Overview, IEEE Transactions on Circuits and Systems for Video Technology, Jun. 2001, pp. 696-702, vol. 11, No. 6, IEEE Computer Society, 2001, ISBN 1051-8215.

B.S. Manjunath, et al., Color and Texture Descriptors, IEEE Transactions on Circuits and Systems for Video Technology, Jun. 2001, pp. 703-715, vol. 11, No. 6, IEEE Computer Society, 2001, ISBN 1051-8215.

"Predefined Properties" http://help.sap.comIsaphelp—ep50sp5/helpdata/en/Ia/9a4a3b80f2ec40aa7456bc87a94259/content.htm.

"Info Vision Infonnation Management System" http://66.1 02. 7.1 04/search?q=cache:m IXV6K6sQOQJ:www.amlib.netlproducts/infovision.htm+customised+multi+property+file+navigation &h1=en.

"Previewing Files in the Common Dialog" http://www .elitevb.comlcontentiO 1,0084,0 II.

"TdcFolderListView component" http://www.appcontrols.comlmanualsIdiskcontrols/index.htm1?tdcfolderlistview.htm.

"Previewing Files" http://developer.apple.comIdocumentation/QuickTimeIINMAC/QT/iqMovieToolbox.1a.htm.

"Text File Previewer 2.0 Beta" http://www .freedownloadscenter.comlUtilitieslText- ViewerslText- File ]reviewer.html.

"Your Next OS: Windows 2006?" http://www.pcworld.comlnewsiarticle/O,aid,II3'631,OO.asp.

"GetOpenFileName Function," downloaded from <http://msdn.microsoft.com>; date of first publication prior to Mar. 28, 2005; 2 pages.

"GetSaveFileName Function," downloaded from <http://msdn.microsoft.com>; date of first publication prior to Mar. 28, 2005; 2 pages.

"Using Common Dialog Boxes," downloaded from <http://msdn.microsoft.com>; date of first publication prior to Mar. 28, 2005; 8 pages.

"How to Use a Common Dialog File Open Dialog with Win32 API," downloaded from <http://support.microsoft.com>; date of first publication prior to Mar. 28, 2005; 3 pp.

"Creating an Enhanced Metafile," downloaded from <http://msdn.microsoft.com>; date of first publication prior to Mar. 28. 2005; 2 pages.

"Common Dialog Box Library," downloaded from <http://msdn.microsoft.com>: date of first publication prior to Mar. 28, 2005; 8 pages.

"Openfilename Structure," downloaded from <http://msdn.microsoft.com>; date of first publication prior to Mar. 28, 2005; 7 pages.

"Open and Save as Dialog Boxes," downloaded from <http://msdn.microsoft.com>; date of first publication prior to Mar. 29, 2005; 9 pages.

"Customizing common dialog boxes," downloaded from http://msdn.microsoft.com; date for first publication prior to Apr. 20, 2005, 4 pages.

G.D. Venolia, et al., Supporting Email Workflow. Microsoft Research Technical Report MSR-TR-2001-88. Revised Dec. 2001 (Original Sep. 2001). Microsoft Corporation, Redmond, WA.

G.D. Venolia and C. Neustaedter. Understanding Sequence and Reply Relationships within Email Converstations: A Mixed-Model Visualization. Microsoft Research Technical Report MSR-TR-2002-102. Sep. 23, 2002 (Revised Jan. 13, 2003).

Microsoft Digital Image Suite User's Manual, Version 9.0. pp. 105-118, Available: http://www.microsoft.com/products/imaging/guides/SuiteManual.pdf, Apr. 30, 2004.

"Using Tags to Organize Your Photos.", Adobe Photoshop Album 2.0 Tutorial, Available: http://www.adobe.com/digitalimag/tips/phsaltaggin/pdfs/phsaltaggin.pdf, Apr. 30, 2004.

Examples of dialogs user interfaces; date of first publication prior to Mar. 31, 2005; 8 pages.

"Visually Theming and Styling Your Applications and Documents" (CLI 308); downloaded from <http://msdn.microsoft.com/longhorn/pdcmaterials/pdctalksavalon/>; date of first publication prior to Mar. 31, 2005; 34 pages.

New User Interface Possibilities in Longhorn (CLI 304); downloaded from <http://msdn.microsoft.com/longhorn/pdcmaterials/pdctalksavalon/>; date of first publication prior to Mar. 31, 2005; 45 pages.

Windows Forms: Exploiting Windows Longhorn "Features from Within Your Application" (CLI 391); downloaded from http://msdn.microsoft.com/longhorn/pdcmaterials/pdctalksavalon/>; date of first publication prior to Mar. 31, 2005; 27 pages.

MessageBox Function; downloaded from <http://msdn.microsoft.com>; date of first publication prior to Mar. 31, 2005; 4 pages.

Creating and Installing Theme Files; downloaded from <http://msdn.microsoft.com>; date of first publication prior to Feb. 21, 2005; 4 pages.

"MessageBox Function"; downloaded from <http://msdn.microsoft.com>; date of first publication prior to Mar. 31, 2005; 4 pages.

"Creating and Installing Theme Files"; downloaded from <http://msdn.microsoft.com>; date of first publication prior to Feb. 21, 2005; 4 pages.

"About Dialog Boxes"; downloaded from <http://msdn.microsoft.com>; date of first publication prior to Feb. 21, 2005; 10 pages.

"Property Sheets and Inspectors"; downloaded from <http://msdn.microsoft.com>; date of first publication prior to Feb. 21, 2005; 6 pages.

"Propsheetpage"; downloaded from <http://msdn.microsoft.com>; date of first publication prior to Feb. 21, 2005; 3 pages.

"DialogProc Function"; downloaded from <http://msdn.microsoft.com>; date of first publication prior to Feb. 21, 2005; 2 pages.

"Creating Wizards"; downloaded from <http://msdn.microsoft.com>; date of first publication prior to Mar. 31, 2005; 17 pages.

"Property Sheets"; downloaded from <http://msdn.microsoft.com>; date of first publication prior to Mar. 31, 2005; 7 pages.

"Property Sheet Reference"; downloaded from <http://msdn.microsoft.com>; date of first publication prior to Mar. 31, 2005; 5 pages.

"DRAWITEMSTRUCT Structure"; downloaded from <http://msdn.microsoft.com>; date of first publication prior to Feb. 25, 2005; 3 pages.

"Using Buttons"; downloaded from <http://msdn.microsoft.com>; date of first publication prior to Feb. 25, 2005; 5 pages.

Button Messages; downloaded from <http://msdn.microsoft.com>; date of first publication prior to Feb. 25, 2005; 4 pages.

"Button Styles"; downloaded from <http://msdn.microsoft.com>; date of first publication prior to Feb. 25, 2005; 2 pages.

"CreateWindow Function"; downloaded from <http://msdn.microsoft.com>; date of first publication prior to Feb. 25, 2005; 5 pages.

"Using Dialog Boxes"; downloaded from <http://msdn.microsoft.com>; date of first publication prior to Mar. 31, 2005; 8 pages.

"CreatePropertySheetPage Function"; downloaded from <http://msdn.microsoft.com>; date of first publication prior to Mar. 31, 2005; 1 page.

"DestroyPropertySheetPage Function"; downloaded from <http://msdn.microsoft.com>; date of first publication prior to Mar. 31, 2005; 1 page.

"PropertySheet Function"; downloaded from <http://msdn.microsoft.com>; date of first publication prior to Mar. 31, 2005; 2 pages.

"PropSheetPageProc Function"; downloaded from <http://msdn.microsoft.com>; date of first publication prior to Mar. 31, 2005; 2 pages.

"PropSheetProc Function"; downloaded from <http://msdn.microsoft.com>; date of first publication prior to Mar. 31, 2005; 2 pages.

"PSN_KILLACTIVE Notification"; downloaded from <http://msdn.microsoft.com>; date of first publication prior to Mar. 31, 2005; 1 page.

"PSN_QUERYCANCEL Notification"; downloaded from <http://msdn.microsoft.com>; date of first publication prior to Mar. 31, 2005; 1 page.

"PSN_RESET Notification"; downloaded from <http://msdn.microsoft.com>; date of first publication prior to Mar. 31, 2005; 1 page.

"PSN_SETACTIVE Notification"; downloaded from <http://msdn.microsoft.com>; date of first publication prior to Mar. 31, 2005; 1 page.

"PSN_TRANSLATEACCELERATOR Notification"; downloaded from <http://msdn.microsoft.com>; date of first publication prior to Mar. 31, 2005; 1 page.

"PSN_WIZBACK Notification"; downloaded from <http://msdn.microsoft.com>; date of first publication prior to Mar. 31, 2005; 3 pages.

"PSN_WIZFINISH Notification"; downloaded from <http://msdn.microsoft.com>; date of first publication prior to Mar. 31, 2005; 1 page.

"PSN_WIZNEXT Notification"; downloaded from <http://msdn.microsoft.com>; date of first publication prior to Mar. 31, 2005; 3 pages.

"PSM_ADDPAGE Message"; downloaded from <http://msdn.microsoft.com>; date of first publication prior to Mar. 31, 2005; 2 pages.

"PSM_IDTOINDEX Message"; downloaded from <http://msdn.microsoft.com>; date of first publication prior to Mar. 31, 2005; 1 page.

"PSM_INDEXTOHWND Message"; downloaded from <http://msdn.microsoft.com>; date of first publication prior to Mar. 31, 2005; 1 page.

"PSM_INDEXTOID Message"; downloaded from <http://msdn.microsoft.com>; date of first publication prior to Mar. 31, 2005; 1 page.

"PSM_INDEXTOPAGE Message"; downloaded from <http://msdn.microsoft.com>; date of first publication prior to Mar. 31, 2005; 1 page.

"PSM_PAGETOINDEX Message"; downloaded from <http://msdn.microsoft.com>; date of first publication prior to Mar. 31, 2005; 1 page.

"PSM_PRESSBUTTON Message"; downloaded from <http://msdn.microsoft.com>; date of first publication prior to Mar. 31, 2005; 1 page.

"PSM_QUERYSIBLINGS Message"; downloaded from <http://msdn.microsoft.com>; date of first publication prior to Mar. 31, 2005; 1 page.

"PSM_SETCURSEL Message"; downloaded from <http://msdn.microsoft.com>; date of first publication prior to Mar. 31, 2005; 1 page.

"PSM_SETCURSELID Message"; downloaded from <http://msdn.microsoft.com>; date of first publication prior to Mar. 31, 2005; 1 page.

"PSM_SETFINISHTEXT Message"; downloaded from <http://msdn.microsoft.com>; date of first publication prior to Mar. 31, 2005; 1 page.

"PSM_SETHEADERTITLE Message"; downloaded from <http://msdn.microsoft.com>; date of first publication prior to Mar. 31, 2005; 1 page.

"PSM_SETWIZBUTTONS Message"; downloaded from <http://msdn.microsoft.com>; date of first publication prior to Mar. 31, 2005; 2 pages.

"Propsheetheader Structure"; downloaded from <http://msdn.microsoft.com>; date of first publication prior to Mar. 31, 2005; 5 pages.

"Propsheetpage Structure"; downloaded from <http://msdn.microsoft.com>; date of first publication prior to Mar. 31, 2005; 4 pages.

"PSHNOTIFY Structure"; downloaded from <http://msdn.microsoft.com>; date of first publication prior to Mar. 31, 2005; 1 page.

"BCM_GETIDEALSIZE Message"; downloaded from <http://msdn.microsoft.com>; date of first publication prior to Mar. 31, 2005; 1 page.

"PSM_SETTITLE Message"; downloaded from <http://msdn.microsoft.com>; date of first publication prior to Mar. 31, 2005; 1 page.

European Search Report for 03007909.9-2211 dated Jun. 30, 2006.

D. Esposito, "More Windows 2000 UI Goodies: Extending Explorer Views by Customizing Hypertext Template Files", MSDN Magazine, <http://msdn.microsoft.com/msdnmag/issues/0600/w2kui2/default.aspx?print=true?, first date of publication unknown but no later than Jun. 2000, 15 pages.

Microsoft: "Microsoft Windows 2000 Professional Step by Step—Lesson 3—Managing Files and Folders" <http://www.microsoft.com/mspress/books/sampshap/1589.asp>, Jan. 5, 2000, 12 pages.

Australian Search Report for SG 200301764-7 dated Mar. 30, 2006.

D. Esposito, Visual C++ Windows Shell Programming, Dec. 1, 1998, Apress, ISBN 1861001843, pp. 463-469.

P. DiLascia, "More Fun with MFC:DIBs, Palettes, Subclassing, and a Gamut of Goodies, Part III", Microsoft Systems Journal, Jun. 1997, 20 pages.

Australian Written Opinion for SG 200301764-7 dated Mar. 30, 2006.

Windows Commander, <http://web.archive.org/web/20030207145141/www.ghisler.com/featurel.htm> (Feb. 7, 2003) and <http://web.archive.org/web/20021017022627/www.ghisler.com/addons.htm> (Oct. 17, 2002), 7 pages.

Microsoft Press Pass, "Windows XP is Here!", New York, Oct. 25, 2001.

Microsoft, "Microsoft Windows XP Professional Product Documentation" section: (1) To Change how you view items in a folder, (2) Viewing files and folders overview, (3) To associate a file with a program, (4) To Change or remove a program, copyright 2006, publication date unknown.

McFedries, Paul, "The Complete Idiot's Guide to Windows XP", Table of Contents, Oct. 3, 2001; Alpha Books, Chapter 8: A Tour of the My Pictures Folder—printed pp. 1-8, Chapter 11: Sights and Sounds: Music and Other Multimedia-printed pp. 1-3.

Stanek R. William, "Microsoft Windows XP Professional Administrator's Pocket Consultant", Sep. 25, 2001; Microsoft Press, Chapter 9, printed pp. 1-8.

Shah, Sarju, "Windows XP Preview", FiringSquad, May 4, 2001, online, printed pp. 1-5; Figure: Hi-Res Image Viewer.

Olivie, et al., "A Generic Metadata Query Tool", 1999, pp. 1-8.

Rathbone, Windows XP for Dummies, 2001, Wiley Publishing, Inc., pp. 145, 203 and 204.

Microsoft Windows XP Professional, 1985-2001.

Written Opinion of Singapore Application No. 200403220-7 dated May 18, 2006.

A.T. McCray, et al., Extending the Role of Metadata in a Digital Library System, May 19, 1999, IEEE, pp. 190-199.

Alexa T. McCray, et al., Principles for Digital Library Development, May 2001, ACM, pp. 49-53.

Stelovsky, J., and C. Aschwanden, "Software Architecture for Unified Management of Event Notification and Stream I/O and Its Use for Recording and Analysis of User Events," *Proceedings of the 35th Annual Hawaii International Conference on System Sciences*, IEEE Computer Society, Big Island, Hawaii, Jan. 7-10, 2002, p. 1862-1867.

"About Managing Messages With Rules", Microsoft® Outlook® 2003 Help file, 3 pp.

"Trillian/Trillian Pro IM Clients" Products Description, © 1999-2004 Cerulean Studios, <http://www.ceruleanstudios.com> [retrieved Apr. 30, 2004].

International Search Report of WO2004/097638 A1 (McKee, et al.) dated Nov. 11, 2004.

Wikipedia, File Allocation Table, 2006, <http://en.wikipedia.org/wiki/File_Allocation_Table>.

Directory Opus 6.1—Viewer SDK Plugin SDK 1.0, GP Software, 2001, <http://web.archive.org/web/20030219151121/www.gpsoft.com.au/Developer.html>, first date of publication unknown but, prior to Feb. 19, 2003, 30 pages.

Rao, J.R., "Some Performance Measures of File Sharing on Multiple Computer Systems," Proceedings of the Conference on Modeling and Simulation, vol. 6, Part I, Pittsburgg, Penn., Apr. 24-25, 1976, pp. 527-530.

Rao, R., et al., "Rich Integration in the Digital Library," Communications of the ACM 38(4):29-39.1995.

Reinauer, R., "UNIX System V.# Remote File Sharing Capabilities and Administration," Unisphere 8(6):64-68, Sep. 1988.

Revelle, A Visual Search Tool for Early Elementary Science Students, Mar. 2002, Journal of Science Education and Technology, vol. 11, pp. 49-57.

"Russian Official Action and English Translation of Official Action for Application No. 2003114526/09 dated May 11, 2007, 7 pages".

Salembier, Philippe, et al., MPEG-7 Multimedia Description Schemes, IEEE Transactions on Circuits and Systems for Video Technology, Jun. 2001,pp. 748-759, vol. 11, No. 6, IEEE Computer Society, 2001, ISBN 1051-8215.

Seltzer, M., et al., "Journaling Versus Soft Updates: Asynchronous Meta-data Protection in File Systems," Proceedings of the 2000 USENIX Technical Conference, San Diego, CA Jun. 18-23, 2000, pp. 71-84.

Shah, Sarju, "Windows XP Preview", FiringSquad, May 4, 2001, online, printed pp. 1-5; Figure: Hi-Res Image Viewer.

Sikora, Thomas, The MPEG-7 Visual Standard for Content Description - An Overview, IEEE Transactions on Circuits and Systems for Video Technology, Jun. 2001, pp. 696-702, vol. 11, No. 6, IEEE Computer Society, 2001, ISBN 1051-8215.

Simpson, Alan, Windows 95 Uncut, 1995, IDC Books Worldwide, Inc., pp. 104-107.

Stanek R. William, "Microsoft Windows XP Professional Administrator's Pocket Consultant", Sep. 25, 2001; Microsoft Press, Chapter 9, printed pp. 1-8.

Stelovsky, J. And C. Aschwanden, "Software Architecture for Unified Management of Event Notification and Stream I/O and Its Use for Recording and Analysis of User Events," Proceedings of the 35th Annual Hawaii International Conference on System Sciences, IEEE Computer Society, Big Island, Hawaii, Jan. 7-10, 2002, p. 1862-1867.

Supplementary European Search Report A33for EP 04780390 dated Jun. 18, 2007.

"Survey of Some Mobile Agent System" - Zhujun (James) Xu - Feb. 10, 2003 (p. 1-22).

"TdcFolderListView component" http://www.appcontrols.comlmanualsidiskcontrols/index.html?tdcfolderlistview.htm.

Templin, P.J., Jr., "Providing a Centralized File Sharing Resource at Bucknell University", Proceedings of the User Services Conference for College and University Services Organization, Bloomington, Ind., Oct. 25-28, 1998, pp. 289-292.

Yeates, Stuart, et al., "Tag Insertion Complexity," Data Compression Conference, (DCC 2001), Snowbird, Utah, USA, Mar. 27-28, 2001, pp. 243-252, IEEE Computer Society 2001, ISBN 1068-0314.

Tony Northrup et al., "Plus! Party Mode: Mix Audio and Video in Playlists," www.microsoft.com/windowsxp/using/windowsmediaplayer/expert/northrup_03march17.mspx, Mar. 17, 2003, 6 pages.

"Trillian/Trillian Pro IM Clients" Products Description, ©1999-2004 Cerulean Studios, <http://ceruleanstudios.com> [retrieved Apr. 30, 2004].

"Using Buttons"; downloaded from <http://msdn.microsoft.com>; date of first publication prior to Feb. 25, 2005; 5 pages.

"Using Common Dialog Boxes," downloaded from <http://msdn.microsoft.com>; date of first publication prior to Mar. 28, 2005; 8 pages.

"Using Dialog Boxes"; downloaded from <http://msdn.microsoft.com>; date of first publication prior to Mar. 31, 2005; 8 pages.

Yamai, N. et al., "NFS-Based Secure File System Over Multiple Administrative Domains With Minimal Administration," Systems and Computers in Japan 33(14):50-58, Dec. 2002.

Venolia, G.D., et al., Supporting Email Workflow. Microsoft Research Technical Report MSR-TR-2001-88. Revised Dec. 2001 (Original Sep. 2001). Microsoft Corporation, Redmond, WA.

Venolia, G.D. and C. Neustaedter, Understanding Sequence and Reply Relationships with Email Conversations: A Mixed-Model Visualization. Microsoft Research Technical Report MSR-TR-2002-102, Sep. 23, 2002 (Revised Jan. 13, 2003).

Verhoeven et al., A Generic Metadata Tool, 10-19999, pp. 1-8.

"Visually Theming and Styling Your Applications and Documents" (CLI308); downloaded from <http://msdn.microsoft.com/longhorn/pdctalksavalon/>; date of first publication prior to Mar. 31, 2005; 34 pages.

Wang, G., et al., "Extending XML Schema with Nonmonotonic Inheritance," in M.A. Jesufeld and 0. Paster (eds.), ER 2003 Workshops, Lecture Notes in Computer Science 2814:402-407.2003.

Wedde, Horst F., et al., A Universal Framework for Managing Metadata in the Distributed Dragon Slayer System, Proceedings of the 26th EUROMICRO Conference (Euromicro'00), vol. 2, Maastricht, The Netherlands, Sep. 5-7, 2000, pp. 96-101, IEEE Computer Society, 2000, ISBN 1089-6503.

Weinreich, H., et al., "The Look of the Link - Concepts of the User Interface of Extended Hyperlinks," Proceedings of the Twelfth ACM Conference on Hypertext and Hypermedia, Hypertext '01, Aarhus, Denmark, Aug. 2001, pp. 19-28.

Written Opinion of Singapore Application No. 200403220-7 dated May 18, 2006.

Windows Commander, <http://web.archive.org/web.archive.org/web/20021017022627/www.ghislercom/addons.htm> and <http://web.archive.org/web/20021017022627/www.ghisler.com/addons.htm>, first date of publication unknown but, prior to Feb. 19, 2003, 30 pages.

Windows Commander, <http://web.archive.org/web/20021017022627/www.ghislercom/addons.htm> and <http://web.archive.org/web/200210170226271www.ghisler.com/addons.htm>, first date of publication unknown but, prior to Jul. 31, 2006, 7 pages.

Windows Forms: Exploiting Windows Longhorn Features from Within Your Application (CL1391); downloaded from http://msdn.microsoft.com/longhorn/pdcmaterials/pdctalksavalon/>:date of publication prior to Mar. 31, 2005; 27 pages.

"PropSheetProc Function"; downloaded from <http://msdn.microsoft.com>, date of first publication prior to Mar. 31, 2005; 2 pages.

Microsoft, "Microsoft Windows XP Professional Product Documentation" section: (1) To Change how you view items in a folder, (2) Viewing files and folders overview, (3) To associate a file with a program, (4) To Change or remove a program, copyright 2006, publication date unknown.

Microsoft Press Pass, "Windows XP is Here!", New York, Oct. 25, 2001.

Microsoft Press, Windows 98 Step by Step, Microsoft Corporation, p. 63, 1998.

Microsoft Windows XP Professional, 1985-2001.

Microsoft, Windows XP Professional, Screen Shots 1-8, copyright (1985-2001).

Microsoft Windows XP Verison 2002 Screen Dumps.

Microsoft Windows XP Version 2002 (Screen Dumps, Figs. 1-16).

"Propsheetpage Structure"; downloaded from <http://msdn.microsoft.com>; date of first publication prior to Mar. 31, 2005; 4 pages.

"Propsheetheader Structure"; downloaded from <http://msdn.microsoft.com>; date of first publication prior to Mar. 31, 2005; 5 pages.

Na, J. and V. Rajaravivarma, "Multimedia File Sharing in Multimedia Home or Office Business Networks," Proceedings of the 35th Southeastern Symposium on System Theory, Morgantown, W.Va., Mar. 16-18, 2003, pp. 237-241.

"PropertySheet Function"; downloaded from <http://msdn.microsoft.com>; date of first publication prior to Mar. 31, 2005; 2 pages.

New User Interface Possibilties in Longhorn (CLI304); downloaded from <http://msdn.microsoft.com/longhormn/pdcmaterials/pdctalksavalon/>; date of first publication prior to Mar. 31, 2005; 45 pages.

"Previewing Files" http://developer.apple.comidocumentation/QuickTimelINMAC/QT/iqMovieToolbox.1.a.htm.

Olivie, et al., "A Generic Metadata Query Tool", 1999, pp. 1-8.

"Open and Save as Dialog Boxes," downloaded from <http://msdn.microsoft.com>; date of first publication prior to Mar. 29, 2005; 9 pages.

"Openfilename Structure," downloaded from <http:msdn.microsoft.com>; date of first publication prior to Mar. 28, 2005; 7 pages.

Piemas, J., et al., "DualIFS: A New Journaling File System Without Meta-Data Duplication," Conference Proceedings of the 2002 International Conference on Supercomputing, New York, Jun. 22-26, 2002, p. 137-146.

"Previewing Files in the Common Dialog" http://www.elitevb.comlconcontentO 1,0084,0 II.

Qian, J., et al., "ACLA: A Framework for Access Control List (ACL) Analysis and Optimization," Fifth Joint Working Conference on Communications and Multimedia Security, Darnstadt, Germany, May 21-22, 2001, pp. 197-211.

Patent Abstracts of Japan, Publication No. 2002-099565, date of publication of application May 4, 2002, 1 page, Information Retrieval Apparatus, Abstract.

Patent Abstracts of Japan, Publication No. 2002-334103, date of publication of application Nov. 22, 2002, 1 page, Retrieval Processing System and Retrieval Processing Method, Abstract.

"Predefined Properties" http://help.sap.comisaphelp - ep50sp5/helpdata/en/I a/9a4a3b80f2ec40aa7456bc87a94259/content.htm.

"Presto: an experimental architecture for fluid interactive document spaces" - Paul Dourish, W. keith Edwards, Anthony LaMarca and Michael Salisbury - ACM Transactions on Computer-human Interaction (TOCHI) vol. 6, Issue 2 ACM Jun. 1999 (pp. 133-161).

"Previewing Files" http://developer.apple.comidocumentation/QuickTimelINMAC/QT/iqMovieToolbox.1.a.htm.

"Property Sheets and Inspectors"; downloaded from <http://msdn.microsoft.com>: date of first publication prior to Feb. 21, 2005; 6 pages.

"Properly Sheets": downloaded from <http:/msdn.microsoft.com>: date of first publication prior to Mar. 31, 2005; 7 pages.

"Properly Sheet Reference"; downloaded from <http://msdn.microsoft.com>: date of first publication prior to Mar. 31, 2005; 5 pages.

"PropSheetPageProc Function"; downloaded from <http://msdn.microsoft.com>; date of first publication prior to Mar. 31, 2005; 2 pages.

"Propsheetpage"; downloaded from <http://msdn.microsoft.com>' date of first publication prior to Feb. 21, 2005; 3 pages.

"PSN_WIZNEXT Notification"; downloaded from <http://msdm.microsoft.> date of first publication prior to Mar. 31, 2005; pp. 3.

"PSHNOTIFY Structure"; downloaded from <http://msdn.microsoft.com>; date of first publication prior to Mar. 31, 2005; 1 page.

"PSN_WIZFINISH Notification"; downloaded from <http://msdn.microsoft.com>; date of first publication prior to Mar. 31, 2005; 1 page.

"PSM_ADDPAGE Message"; downloaded from <http://msdn.microsoft.com>' date of first publication prior to Mar. 31, 2005; 2 pages.

"PSM_HWDTOINDEX Message"; downloaded from <http://msdn.microsoft.com>; date of first publication prior to Mar. 31, 2005; 1 page.

"PSN_WIZBACK Notification"; downloaded from <http://msdn.microsoft.com>; date of first publication prior to Mar. 31, 2005; 3 pages.

"PSM_IDTOINDEX Message"; downloaded from <http://msdn.microsoft.com>' date of first publication prior to Mar. 31, 2005; 1 page.

"PSN_TRANSLATEACCELERATOR Notification"; downloaded from <http://msdn.microsoft.com>; date of first publication prior to Mar. 31, 2005; 1 page.

"PSM_INDEXTOHWND Message"; downloaded from <http://msdn.microsoft.com>' date of first publication prior to Mar. 31, 2005; 1 page.

"PSM_INDEXTOID Message"; downloaded from <http://msdn.microsoft.com>' date of first publication prior to Mar. 31, 2005; 1 page.

"PSM_INDEXTOPAGE Message"; downloaded from <http://msdn.microsoft.com>' date of first publication prior to Mar. 31, 2005; 1 page.
"PSN_SETACTIVE Notification"; downloaded from <http://msdn.microsoft.com>; date of first publication prior to Mar. 31, 2005; 1 page.
"PSM_PAGETOINDEX Message"; downloaded from <http://msdn.microsoft.com>' date of first publication prior to Mar. 31, 2005; 1 page.
"PSN_RESET Notification"; downloaded from <http://msdn.microsoft.com>; date of first publication prior to Mar. 31, 2005; 1 page.
"PSM_PRESSBUTTON Message"; downloaded from <http://msdn.microsoft.com>' date of first publication prior to Mar. 31, 2005; 1 page.
"PSN_QUERYCANCEL Notification"; downloaded from <http://msdn.microsoft.com>; date of first publication prior to Mar. 31, 2005; 1 page.
"PSM_QUERYSIBLINGS Message"; downloaded from <http://msdn.microsoft.com>' date of first publication prior to Mar. 31, 2005; 1 page.
"PSN_KILLACTIVE Notification"; downloaded from <http://msdn.microsoft.com>; date of first publication prior to Mar. 31, 2005; 1 page.
"PSM_SETCURSEL Message"; downloaded from <http://msdn.microsoft.com>' date of first publication prior to Mar. 31, 2005; 1 page.
"PSM_SETWIZBUTTONS Message"; downloaded from <http://msdn.microsoft.com>' date of first publication prior to Mar. 31, 2005; 2 pages.
"PSM_SETCURSELID Message"; downloaded from <http://msdn.microsoft.com>' date of first publication prior to Mar. 31, 2005; 1 page.
"PSM_SETTITLE Message"; downloaded from <http://msdn.microsoft.com>; date of first publication prior to Mar. 31, 2005; 1 page.
"PSM_SETHEADERTITLE Message"; downloaded from <http://msdn.microsoft.com>' date of first publication prior to Mar. 31, 2005; 1 page.
"Common Dialog Box Library," downloaded from <http://msdn.microsoft.com>; date of first publication prior to Mar. 28, 2005; 8 pages.
Cooper, A., About Face the Essentials of User Interface Design, IDG Books, 1995, p. 141.
Coster, R. and D. Svensson, "Inverted File Search Algorithms for Collaborative Filtering," Proceedings of the 25th Annual International ACM SIGIR Conference on Research and Development in Information Retrieval, Tampere, Finland, Aug. 11-15, 2002.
"CreatePropertySheetPageFunction"; downloaded from <http://msdn.microsoft.com>; date of first publication prior to Mar. 31, 2005; 1 page.
"CreateWindow Function"; downloaded from <http://msdn.microsoft.com>; date of first publication prior to Feb. 25, 2005; 5 pages.
"Creating an Enhanced Metafile," downloaded from <http://msdn.microsoft.com>' date of first publication prior to Mar. 28, 2005; 2 pages.
Creating and Installing Theme Files; downloaded from <http://msdn.microsoft.com>; date of first publication prior to Feb. 21, 2005; 4 pages.
"Creating Wizards"; downloaded from <http://msdn.microsoft.com>; date of first publication prior to Mar. 31, 2005; 17 pages.
"Customizing common dialog boxes," downloaded from http:msdn.microsoft.com; date of first publication prior to Apr. 20, 2005; 4 pages.
David Campbell, "Extending the Windows Explorer with Name Space Extensions," Microsoft Systems Journal, Microsoft co., vol. 5, No. 6, Jul. 1996, pp. 89-96.
Desal, Bipin C., et al., "Resource Discovery: Modeling, Cataloguing and Searching," Seventh International Workshop on Database and Expert Systems Applications (DEXA'96), Zurich, Switzerland, Sep. 9-10, 1996, pp. 70-75, IEEE-CS Press, 1996, ISBN 0-8186-7662-0+A54.

"DestroyPropertySheetPage Function"; downloaded from <http://msdn.microsoft.com>; date of first publication prior to Mar. 31, 2005; 1 page.
"DialogProc Function"; downloaded from <http://msdn.microsoft.com>; date of first publication prior to Feb. 21, 2005; 2 pages.
DiLascia, P., "More Fun with MFC:DIBS, Palettes, Subclassing, and a Gamut of Goodies, Part III", Microsoft Systems Journal, Jun. 1997, 20 pages.
Directory Opus 6.1 - Viewer Plugin SDK 1.0, GP Software, 2001, <http://web.archive.org/web/20030219151121/www.gpsoft.com.au/Developer.html>, first date of publication unknown but, prior to Feb. 19, 2003, 30 pages.
Dorot V., Explanatory Dictionary on Modern Computer Vocabulary, S. Petersburg, BHV-Petersburg, pp. 218-219.
"DRAWITEMSTRUCT Structure"; downloaded from <http://msdn.microsoft.com>; date of first publication prior to Feb. 25, 2005; 3 pages.
Ed Bott et al., "Master Your Music Library," www.microsoft.com/windowsxp/using/windowsmediaplayer/expert/ bott_03may05.mspx, May 5, 2003, 7 pages.
English translation of Office Action for CN03801850.0, dated Aug. 10, 2007.
"About Dialog Boxes"; downloaded from <http://msdn.microsoft.conn>; date of first publication prior to Feb. 21, 2005; 10 pages.
"About Managing Messages With Rules", Microsoft® Outlook® 2003 Help file, 3 pp.
Adobe, Inc., et al., "Adobe Photoshop CS Classroom in a Book," Dec. 1, 2003, pp. 1-29.
Adobe, Inc., et al., "Adobe Photoshop 7.0"; 2001; pp. 1-9.
Ahanger, Gulrukh, et al., Automatic Composition Techniques for Video Production, IEEE Transactions on Knowledge and Data Engineering, Nov./Dec. 1998, pp. 967-987, vol. 10, No. 6, IEEE Computer Society 1998, ISBN 1041-4347.
"An Object-Oriented Model for a Multi-media Patient Folder Management System" - Fernando Ferri, Domenico M. Pisanelli & Fabrizio L. Ricci - ACM SIBGIO Newsletter, vol. 16, Issue 1, (Jun. 1996), (pp. 2-18).
Anonymous, "Organize Your Digital Media Collection," www.microsoft.com/windowsxp/using/windowsmediaplayer/getstarted/organize.mspx, Jun. 30, 2003, 3 pages.
"A Tamper-Resistant and Portable Healthcare Folder" - Anciaux et al. - Hindawai Publishing Corporation, International Journal of Telemedicine and Applications - vol. 1995, Article ID 763534, (pp. 1-9).
Blair, C. and G.E. Monahan, "Optical Sequential File Search: A Reduced-State Dynamic Programming Approach," European Journal of Operational Research 86(2):358-365, 1995.
"BCM_GETIDEALSIZE Message"; downloaded from <http://msdn.microsoft.com>; date of first publication prior to Mar. 31, 2005; 1 page.
Bott, et al., Book titled "Special Edition Using Windows 98, Second Edition," Dec. 21, 1999, second edition, pp. 1-7.
Bott, et al., "Microsoft Windows XP Inside Out", Microsoft Press, 2001, Chapter 11, 39 pages.
Button Messages; downloaded from <http://msdn.microsoft.com>; date of first publication prior to Feb. 25, 2005; 4 pages.
"Button Styles"; downloaded from <http://msdn.microsoft.com>; date of first publication prior to Feb. 25, 2005; 2 pages.
Clay, L.M., et al., "Posting Protocol for Improved Keyword Search Success in Peer-to-Peer File Sharing Systems," Proceedings of SPIE-Int. Soc. Opot. Eng., Santa Clara, CA, Jan. 23-24, 2003, vol. 5019, pp. 138-149.
Cohen, et al., "A Case for Associative Peer to Peer Overlays" -ACM SICOMM Computer Communications Review, vol. 33, No. 1, Jan. 2003, pp. 95-100.
Cohen, J., "The Unofficial Guide to the Workplace Shell," Apr. 5, 1992, XP002227246, 45 pp., retrieved from Internet, http://www.verfasserde/web/web.nsf/c5.
Esposito, D., Visual C++Windows Shell Programming, Dec. 1, 1998, Apress, ISBN 1861001843, pp. 463-469.
Esposito, Dino, More Windows 2000 UI Goodies: Extending Explorer Views by Customizing Hypertext Template Files, first date of publication unknown, but prior to Jun. 16, 2006, 15 pages.

Esposito, Dino, "New Graphical Interface: Enhance Your Programs with New Windows XP Shell Features," MSDN Magazine, Nov. 2001, vol. 16, No. 11.

Microsoft: "Microsoft Windows 2000 Professional Step by Step - Lesson 3 - Managing Files and Folders" <http://www.microsoft.com/mspress/books/sampshap/1589.asp>, Jan. 5, 2000, 12 pages.

European Search Report dated Sep. 20, 2007 for European Patent Application No. 05 10 3492, 9 pages.

European Search Report for 03007909.-2211 dated Jun. 30, 2006.

Examination Report for New Zealand Patent No. 534665 dated Jul. 27, 2007*.

Examples of dialogs user interfaces; date of first publication prior to Mar. 31, 2005; 8 pages.

Faichney, Jolon, et al.; Goldleaf Hierarchical Document Browser, Second Australian User Interface Conference (AUIC'01), Gold Coast, Queensland, Australia, Jan. 29 - Feb. 1, 2001, pp. 13-20, IEEE Computer Society, 2001, ISBN 0-7695-0969-X.

Feng, et al., "Schemata Transformation of Object-Oriented Conceptual Models to XML", Computer Systems Science & Engineering, vol. 18, No. 1, Jan. 2003.

"GetOpenFileNameFunction," downloaded from <http://msdn.microsoft.com>; date of first publication prior to Mar. 28, 2005; 2 pages.

GetSaveFileNameFunction, downloaded from <http://msdn.microsoft.com>; date of first publication prior to Mar. 28, 2005; 2 pages.

Gifford, D.K., et al., "Semantic File Systems," Proceedings of the 13th ACM Symposium on Operating Systems Principles, Pacific Grove, CA, Sep. 1991, pp. 16-25.

Heinlein, et al.; "Integration of Message Passing and Shared Memory in the Stanford FLASH Multiprocessor, Architectural Support for Programming Languages and Operating Systems," pp. 38-50, published 1994.

"How to Use a Common Dialog File Open Dialog with Win32 API," downloaded from <http://support.microsoft,com>; date of first publication prior to Mar. 28, 2005; 3 pp.

Hunter, Jane, An Overview of the MPEG-7 Description Language (DDL), IEEE Transactions on Circuits and Systems for Video Technology, Jun. 2001, pp. 765-772, vol. 11, No. 6, IEEE Computer Society, 2001, ISBN 1051-8215.

"Info Vision Information Management System" http:/166.1 02. 7.1 04/search?q=cache:m IXV6K6sQ0QJ :www.amlib.netlproducts/infovision.htm+customised+multi+property+file+navigation &hl=en.

"International Search Report and Written Opinion of PCT/US04/25931 dated Apr. 3, 2007".

International Search Report of PCT/US05/26655 dated Jun. 23, 2005.

International Search Report of WO2004/097638 A1 (McKee, et al.) dated Nov. 11, 2004.

Joseph, M., "The UML for Data Modellers," Elektron, Apr. 2004, pp. 72-73.

Michael Halvorson and Michael Young, Microsoft Office XP, Processional Official Manual, 1st Ed., Nikkei BP Soft Press, Jul. 23, 2001, pp. 78-80.

Microsoft Digital Image Suite User's Manual, Version 9.0, pp. 105-118, Available: http://www.microsoft.com/ products/imaging/guides/SuiteManual.pdf, Apr. 30, 2004.

* cited by examiner

ADDRESS BAR USER INTERFACE CONTROL

CROSS-REFERENCE TO RELATED APPLICATION

This application is a continuation in part of prior U.S. application Ser. No. 10/420,040, filed Apr. 17, 2003, the entire contents of which are incorporated herein.

FIELD OF THE INVENTION

The present invention relates to graphical user interface controls and, in particular, to a graphical user interface control for navigating within a computer file system.

BACKGROUND OF THE INVENTION

As users navigate within a file system on a computer, a conventional graphical interface control, referred to as an address bar, shows the users where they are in the file system hierarchy. The conventional address bar shows the current location in terms of the file system's hierarchical structure of folders, subfolders, and files. Altering the user's location displayed in the conventional address bar is typically performed in one of two manners. The first is to manually edit the address in the address bar. Manually editing the address in the address bar permits a user to relocate to any number of locations in the file system hierarchy, but requires the user to have specific information regarding the organization of the file system on the computer, i.e., a specific file system location. The second method involves using external navigation tools which, when manipulated, update the address bar to reflect the new address or location. While bypassing the manual edit of the address in the address bar, manipulating external navigation tools still requires the user to have specific information concerning the organization of the file system and traverse the hierarchical structure. However, conventional address bars cannot reference files or data stored among multiple file system locations, such as folders or drives, due to a one-to-one relationship between the address in the address bar and a specific location in the file system hierarchy.

The prior art lacks an address bar that allows users to specify addresses that display files stored among multiple file system locations. The prior art further lacks an address bar that also permits users to easily modify the address of the address bar without manually editing the address, or requiring specific knowledge concerning the organization of the underlying file system. Also lacking in the prior art is an address bar that presents alternative selections of files to the user from which the user may select to navigate to those selections of files. Such an address bar could also selectively present a conventional address bar interface to the user enabling the user to interact with the address bar according to previous experience according to user preferences.

SUMMARY OF THE INVENTION

An address bar for selecting content stored in a physical or virtual location is provided. The address bar may comprise a plurality of segments. Each segment may correspond to a filter or selection criteria for selecting stored content. A segment may include more than one filter or selection criteria, where the content corresponding to each of the filters or selection criteria in a segment may be represented. In this instance, a logical "or" operation referred to as "OR" filtering occurs where content corresponding to separate selection criteria from two or more different locations, whether virtual or physical, can be accessed. Collectively, the corresponding filters of the segments in the address bar represent an address for selecting content stored on a computer file system.

Each segment is an interactive segment that can respond to user interactions to modify the address of the address bar. Selecting a segment in the address bar causes those segments subsequent to the selected segment to be removed from the address bar.

According to one aspect, selecting a child control associated with a segment in the address bar causes a list of selectable child filters or selection criteria to be displayed to the user. The child filters or selection criteria are children of the filter(s) or selection criteria included with the segment. Selecting one of the child filters or selection criteria from the list of child filters or selection criteria causes the current (child) filter or selection criteria of the segment displayed in the address bar, if different from the selected child filter or selection criteria, to be replaced with the selected child filter or selection criteria. Additionally, those segments subsequent to the segment of the replaced child filter or selection criteria are removed from the address bar.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
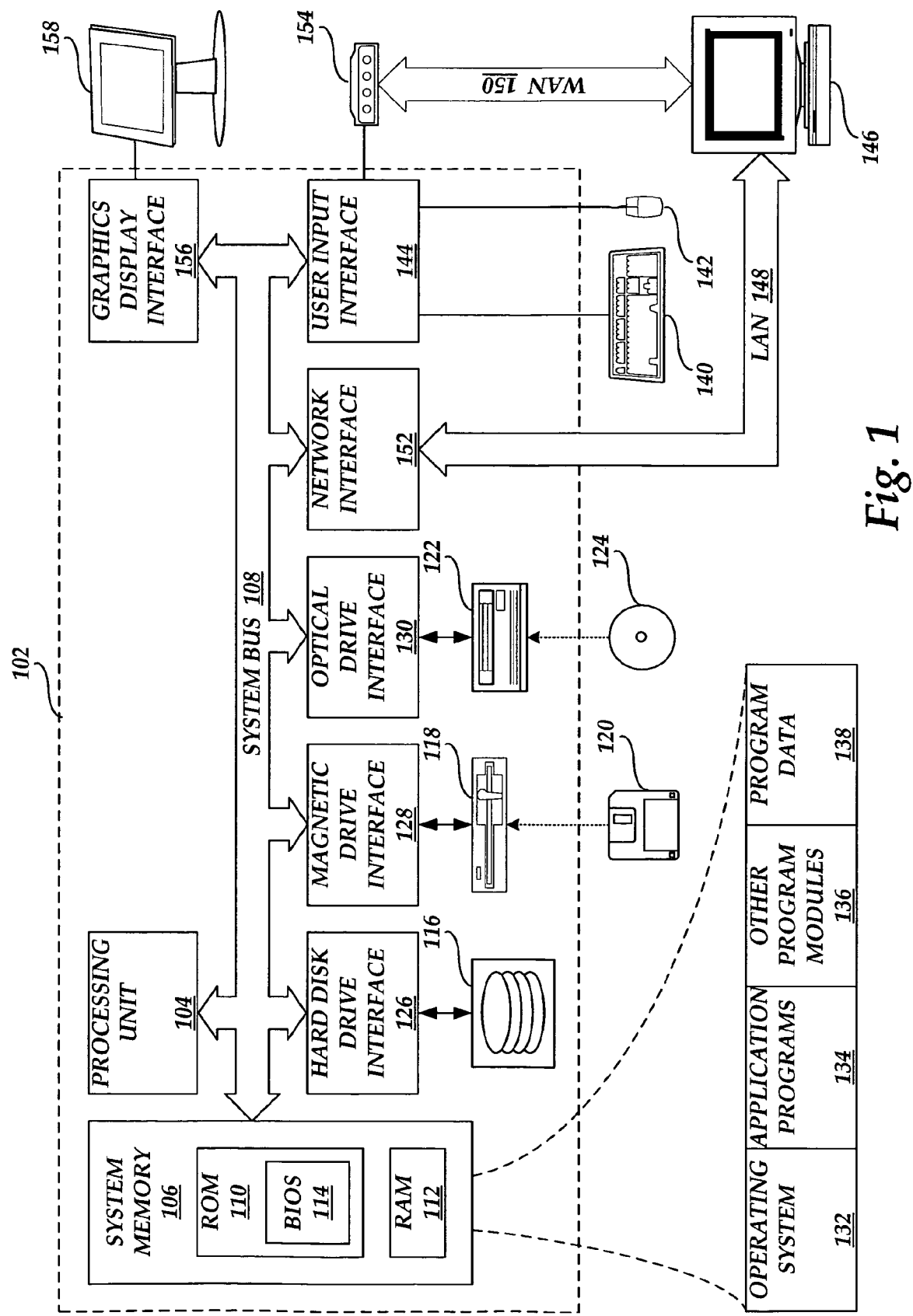
FIG. 1 is a block diagram of an exemplary computer system suitable for implementing the present invention.

FIG. 1 and the following discussion are intended to provide a brief, general description of a computing system suitable for implementing various features of the invention. While the computing system will be described in the general context of a personal computer usable in a distributed computing environment, where complementary tasks are performed by remote computing devices linked together through a communications network, those skilled in the art will appreciate that the invention may be practiced with many other computer system configurations, including multiprocessor systems, minicomputers, mainframe computers, and the like. The invention may be practiced in a local area network or, alternatively, on a single computer using logical, rather than physically remote, devices.

While aspects of the invention may be described in terms of application programs that run on an operating system in conjunction with a personal computer, those skilled in the art will recognize that those aspects also may be implemented in combination with other program modules. Generally, program modules include routines, programs, components, data structures, etc. that perform particular tasks or implement particular abstract data types.

With reference to FIG. 1, an exemplary system for implementing the invention includes a conventional personal computer 102, including a processing unit 104, a system memory 106, and a system bus 108 that couples the system memory to the processing unit 104. The system memory 106 includes read-only memory (ROM) 110 and random-access memory (RAM) 112. A basic input/output system 114 (BIOS), containing the basic routines that help to transfer information between elements within the personal computer 102, such as during startup, is stored in ROM 110. The personal computer 102 further includes a hard disk drive 116, a magnetic disk drive 118, e.g., to read from or write to a removable disk 120, and an optical disk drive 122, e.g., for reading a CD-ROM disk 124 or to read from or write to other optical media. The hard disk drive 116, magnetic disk drive 118, and optical disk drive 122 are connected to the system bus 108 by a hard disk drive interface 126, a magnetic disk drive interface 128, and an optical drive interface 130, respectively. The drives and their associated computer-readable media provide nonvolatile storage for the personal computer 102. Although the description of computer-readable media above refers to a hard disk, a removable magnetic disk, and a CD-ROM disk, it should be appreciated by those skilled in the art that other types of media that are readable by a computer, such as magnetic cassettes, flash memory cards, digital video disks, Bernoulli cartridges, ZIP disks, and the like may also be used in the exemplary operating environment.

A number of program modules may be stored in the drives and RAM 112, including an operating system 132, one or more application programs 134, other program modules 136, and program data 138. A user may enter commands and information into the personal computer 102 through input devices such as a keyboard 140 or a mouse 142. Other input devices (not shown) may include a microphone, touchpad, joystick, game pad, satellite dish, scanner, or the like. These and other input devices are often connected to the processing unit 104 through a user input interface 144 that is coupled to the system bus, but may be connected by other interfaces (not shown), such as a game port or a universal serial bus (USB). A display device 158 is also connected to the system bus 108 via a display subsystem that typically includes a graphics display interface 156 and a code module, sometimes referred to as a display driver, to interface with the graphics display interface. While illustrated as a stand-alone device, the display device 158 could be integrated into the housing of the personal computer 102. Furthermore, in other computing systems suitable for implementing the invention, such as a personal digital assistant (PDA), the display could be overlaid with a touch-screen. In addition to the elements illustrated in FIG. 1, personal computers also typically include other peripheral output devices (not shown), such as speakers or printers.

The personal computer 102 may operate in a networked environment using logical connections to one or more remote computers, such as a remote computer 146. The remote computer 146 may be a server, a router, a peer device, or other common network node, and typically includes many or all of the elements described relative to the personal computer 102. The logical connections depicted in FIG. 1 include a local area network (LAN) 148 and a wide area network (WAN) 150. Such networking environments are commonplace in offices, enterprise-wide computer networks, intranets, and the Internet.

When used in a LAN networking environment, the personal computer 102 is connected to the LAN 148 through a network interface 152. When used in a WAN networking environment, the personal computer 102 typically includes a modem 154 or other means for establishing communications over the WAN 150, such as the Internet. The modem 154, which may be internal or external, is connected to the system bus 108 via the user input interface 144. In a networked environment, program modules depicted relative to the personal computer 102, or portions thereof, may be stored in the remote memory storage device. It will be appreciated that the network connections shown are exemplary and other means of establishing a communications link between the computers may be used. In addition, the LAN 148 and WAN 150 may be used as a source of nonvolatile storage for the system.

Figure 2:
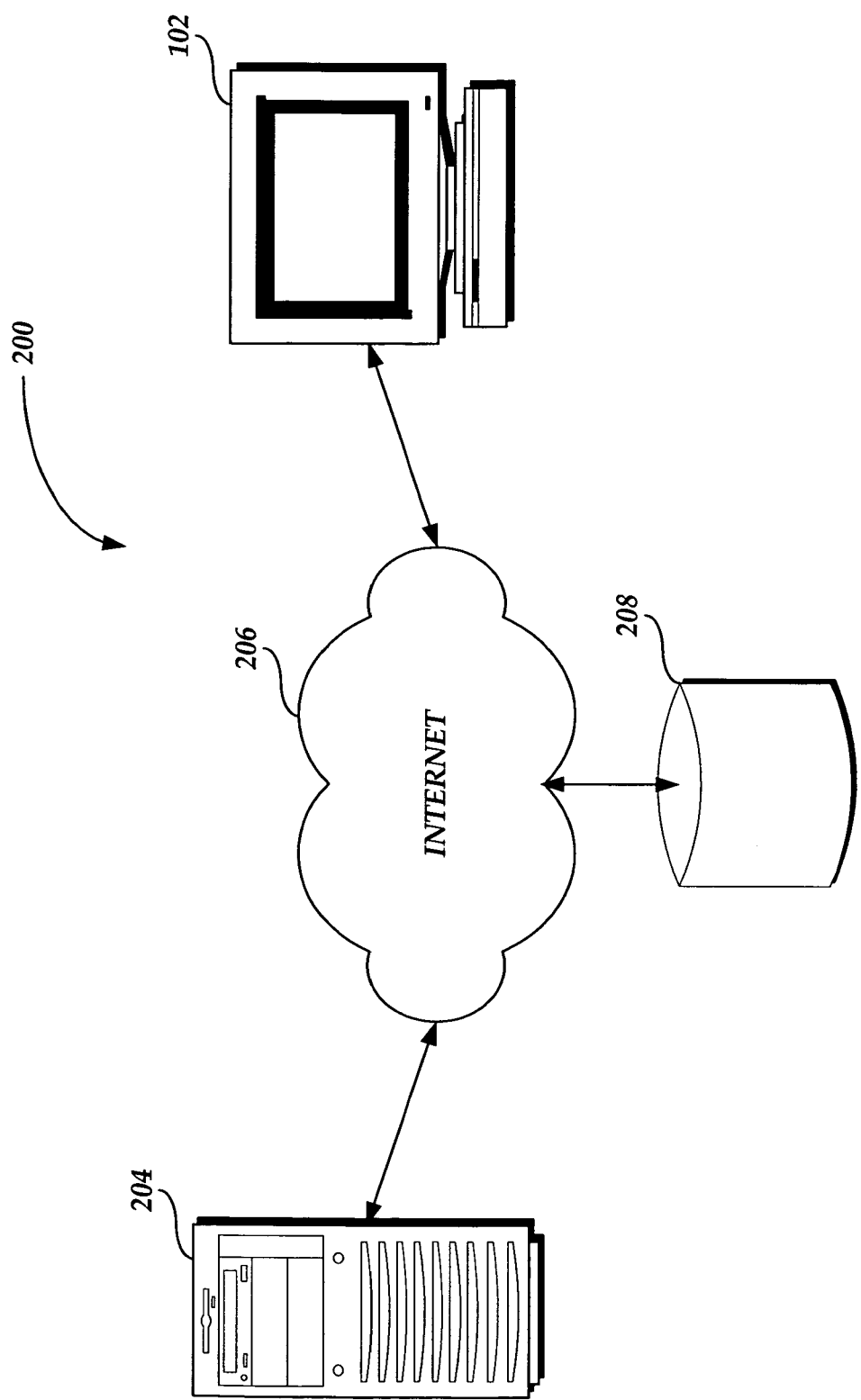
FIG. 2 is a pictorial diagram of an exemplary networked computer environment suitable for implementing the present invention.

FIG. 2 is a block diagram of an exemplary networked computing environment 200 suitable for operating the present invention. The exemplary networked computing environment 200 includes a computing device, such as the personal computer 102 described in regard to FIG. 1, for interacting with a user, and upon which the user may view files stored either locally or remotely to the computing device. While the following discussion describes the present invention in relation to a personal computer, it should be understood that the computing device 102 includes many types of physical devices including, but not limited to mini- and mainframe computers, PDAs, tablet computers, and other devices capable of interacting with a user and displaying files and content stored on the computing device and elsewhere.

The exemplary networked computing environment 200 may also include one or more remote servers, such as server 204 that stores files accessible to the computing device 102, and connected to the computing device via a communications network, such as the Internet 206, as shown in FIG. 2. In addition, the computing device 102 may also be connected to other information sources storing files or other content, such as a remote database 208. Those skilled in the art will recognize that files and information stored on both the remote server 204 and the remote database 208, as well as on local storage devices such as hard disk drive 166 (FIG. 1), may be accessible to, and displayable on, the computing device 102 as part of an integrated file system on the computing device. Additionally, while a particular configuration of a remote server 204 and remote database 208 is presented in FIG. 2, those skilled in the art will readily recognize that this particular configuration is for illustrative purposes only, and should not be construed as limiting upon the present invention.

Figure 3:
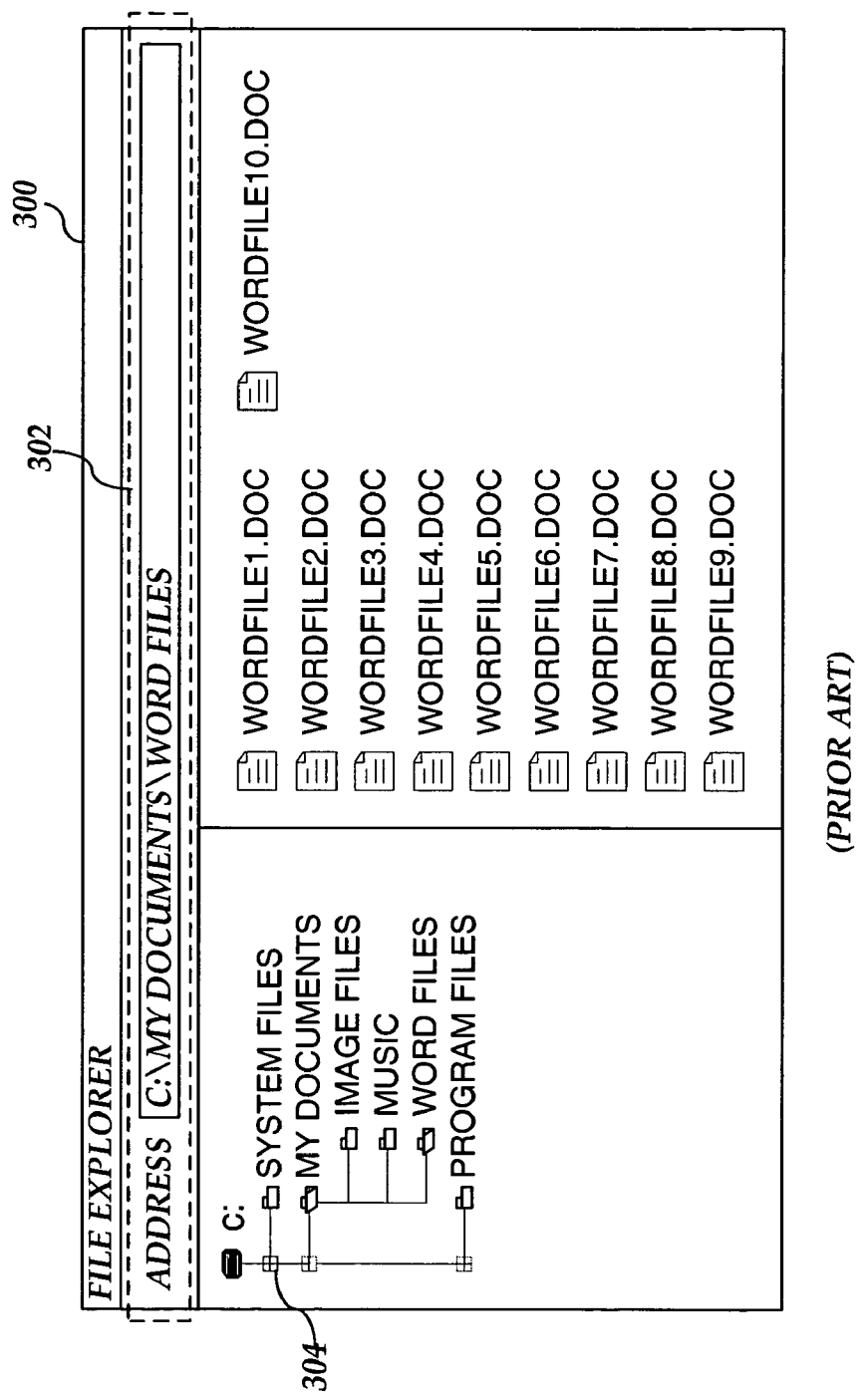
FIG. 3 is a pictorial diagram illustrating an exemplary file viewer having a conventional address bar associated with displaying files in a computer file system, as found in the prior art.

FIG. 3 illustrates an exemplary file viewer 300 having a conventional address bar 302 associated with displaying files in a computer file system, as found in the prior art. For purposes of the present discussion, a file viewer is a view or window on a display device, such as display device 158 (FIG. 1), for displaying files or other content to a user. A file viewer may be a window corresponding to an executable program specifically for displaying files to a user. Alternatively, a file viewer may be a view within an open or closed dialog box on an executable program that must save or retrieve data from a storage device connected locally or remotely to the computer system. It should be noted that the above examples of a file viewer are illustrative, and should not be construed as limiting upon the present invention.

An address in the conventional address bar 302 corresponds to a specific location in a file system. As previously described, in order to edit the address displayed in the conventional address bar 302, a user must modify the address according to specific knowledge of the file system. Alternatively, a user may select an entry in a tree view 304 to navigate to an alternative location. Those skilled in the art will recognize that other controls external to the address bar 302 may also be available that are not shown in the exemplary file view 300. While the address displayed in the conventional address bar 302 corresponds to a specific location in a file system, related files distributed among multiple folders in the file system cannot be displayed in conjunction with the conventional address bar 302.

Figure 4:
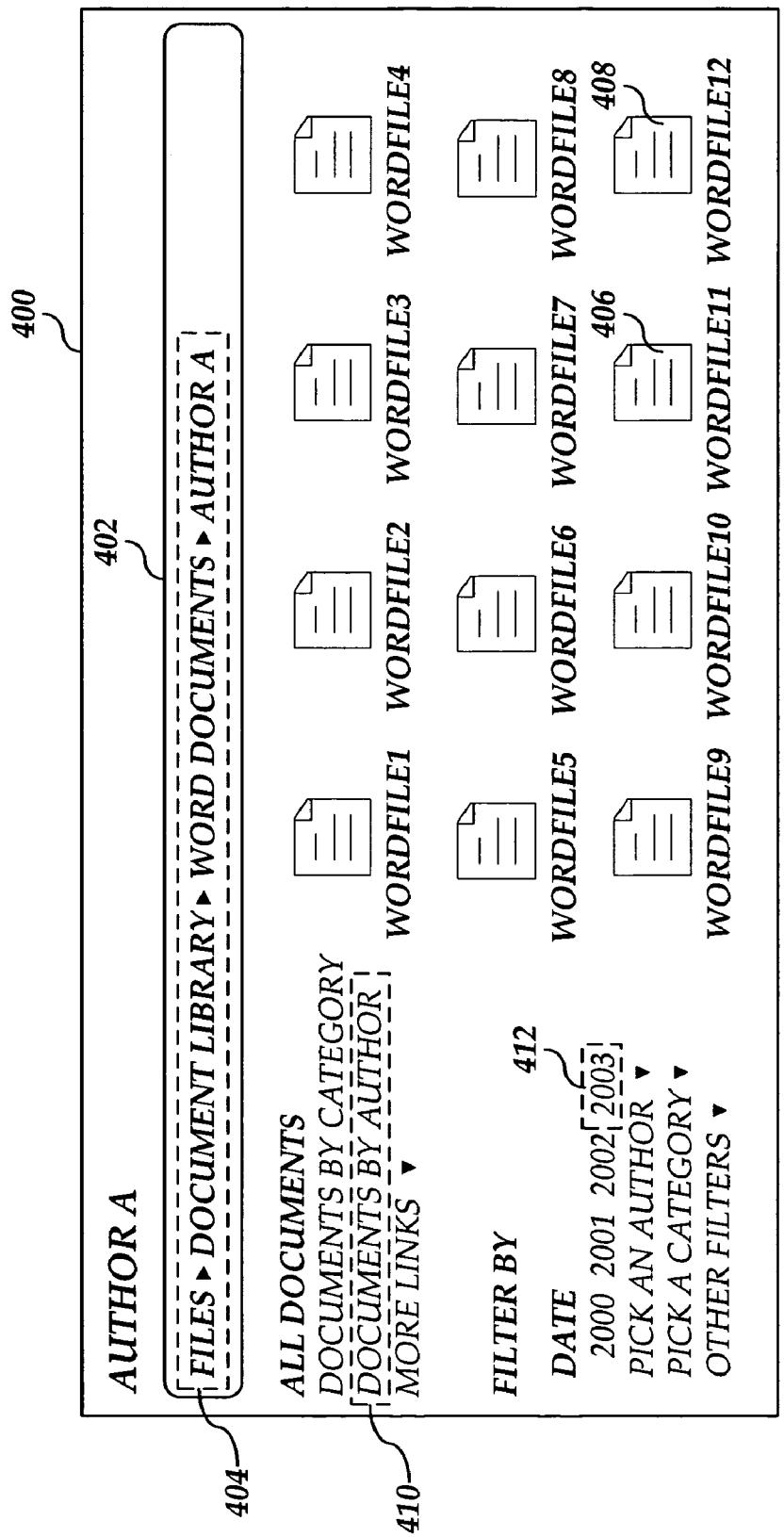
FIG. 4 is a pictorial diagram illustrating an exemplary file viewer for displaying files in a computer file system in accordance with a virtual address in a virtual address bar formed in accordance with the present invention.

FIG. 4 illustrates an exemplary file viewer 400 having a virtual address bar 402 associated with displaying files in a computer file system. The virtual address bar 402, having a virtual address 404, is configured to display similar information to that displayed by the conventional address 304 of the prior art file viewer 300 of FIG. 3. A virtual address, also referred to as a virtual path, references files stored in a computer file system according to selection criteria.

Similar to a conventional address, such as address 304 of FIG. 3, the virtual address's selection criteria may reference files stored in a specific location in the file system hierarchy. However, in contrast to a conventional address, the virtual address's selection criteria may also reference files irrespective of their specific file system location. Thus, a virtual address may reference files stored in multiple locations in a computer file system including physical and virtual locations. As shown in FIG. 4, the file viewer 400, according to the virtual address 404 in the virtual address bar 402, is able to display additional files, such as files 406 and 408, not found in the file viewer 300 of FIG. 3. Additionally, the virtual address bar 402 may also be utilized to display content other than files in a computer file system. For example, the virtual address bar 402 may be used to reference content including system devices, system services, or Internet locations.

Figure 5A:
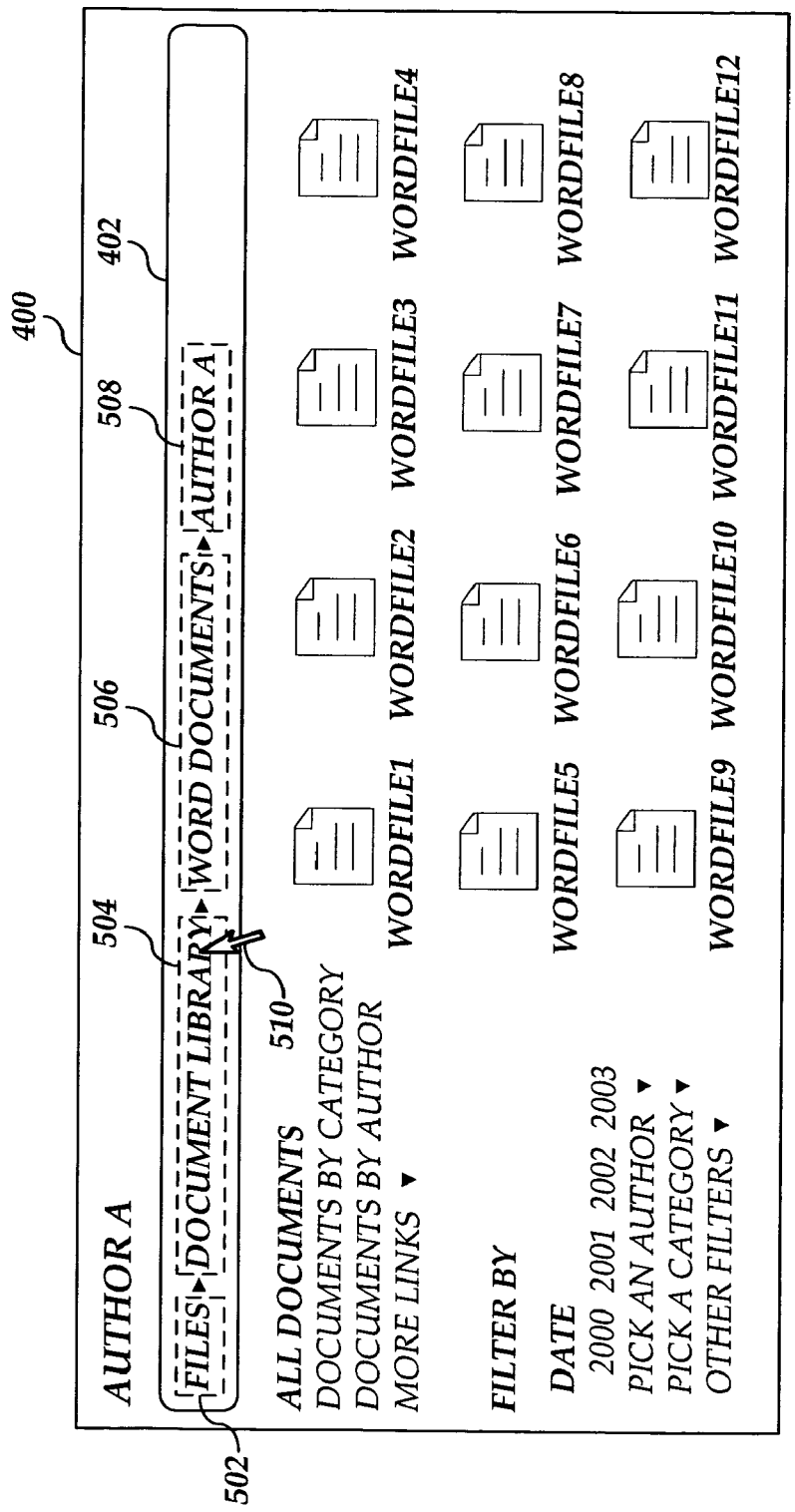
FIG. 5A is a pictorial diagram of the exemplary file viewer of FIG. 4 illustrating selecting a segment of the virtual address in the virtual address bar to navigate in the file system.

FIG. 5A illustrates manipulating a segment of the virtual address 404 in the virtual address bar 402 in order to navigate in a computer file system. Each virtual address bar, such as virtual address bar 402, is comprised of one or more interactive segments, such as segments 502, 504, 506, and 508. Each segment in a virtual address bar may correspond to one or more predetermined filters, or selection criteria, on all of the available content or files accessible to a computer file system. Collectively, the filters of all of the segments in a virtual address bar 402 represent the virtual address bar's virtual address.

The first segment in a virtual address bar, such as segment 502, is referred to as a root segment, or root filter. The root segment represents the broadest category of content available for selection by the virtual address bar 402. For example, segment 502 "Files" would likely represent a filter that references all files accessible to the computer file system. Alternatively, a root segment may represent a filter that references all system services available to the user on the computer system, or a filter that references all hardware devices installed in the computer system. Those skilled in the art will recognize that numerous other alternative root filters may be utilized by the present invention. Thus, the above described examples are given for illustrative purposes, and should not be construed as limiting upon the present invention. Additionally, the labels displayed for each segment, such as "Files" on the root segment 502, are illustrative and should not be construed as limiting upon the present invention. According to one illustrative embodiment, a label displayed on a segment is user configurable.

Each additional segment in a virtual address bar 402, such as segments 504, 506, and 508, represent additional filters to be applied when selecting and displaying files or content in a file viewer 400. For example, root segment 502 "Files" references all files available to the computer system. Segment 504 "Document Library" filters the files selected by the root segment 502, by selecting those files that were generated as documents by the user, such as through a word processor, spreadsheet, or some other document generating application. Segment 506 "Word Documents" filters the files selected by segment 504 according to those documents that were generated using a word processor, such as Microsoft Corporation's Word application. Finally, segment 508 "Author A" filters the word processing documents selected by segment 506 according to whether they were authored by "Author A." Thus, content selected according to the virtual address represented in the virtual address bar 402 must satisfy the filters corresponding to all of the segments in the virtual address bar.

Segments in the virtual address bar 402 are generally ordered from those filters that are most inclusive, to those filters that are least inclusive. For example, as previously discussed, segment 502 "Files" is the broadest and most inclusive. Segments 506 "Word Documents" and segment 508 "Author A" are less inclusive. The virtual address bar 402 illustrates the ordering of segments from left to right, and, for purposes of the present discussion, segments 504, 506, and 508 are subsequent to the root segment 502. However, it should be understood that other orientations are possible, such as a top-down arrangement, without departing from the scope of the invention. Thus, the orientation from left to right should be viewed as illustrative, and not construed as limiting on the present invention.

As previously mentioned, segments in a virtual address bar 402, such as segments 502, 504, 506, and 508, do not necessarily correspond to specific locations in a computer file system, such as folders, drives, and directories. Thus, segment 504 "Document Library" may reference files or content distributed on multiple servers, drives, or folders/directories. However, certain segments in a virtual address bar 402 may reference specific locations with a computer file system hierarchy. A further discussion of virtual address segments referencing specific file system locations is given below in regard to FIGS. 9A and 9B.

In contrast to a conventional address bar, each segment in a virtual address bar 402 represents an actionable, interactive user interface element. For example, a segment in a virtual address bar 402 is responsive to user selection, monitors whether a cursor is located over the segment for a specific period of time, and may be removed from the virtual address bar by a dragging user interaction. Hence, as shown in FIG. 5A, a user may place a cursor 510 over a segment in the virtual address bar 402, such as segment 504 "Document Library," to select, or click, on that segment in order to navigate to that level, i.e., truncate the virtual address at that segment, as described in regard to FIG. 5B.

Figure 5B:
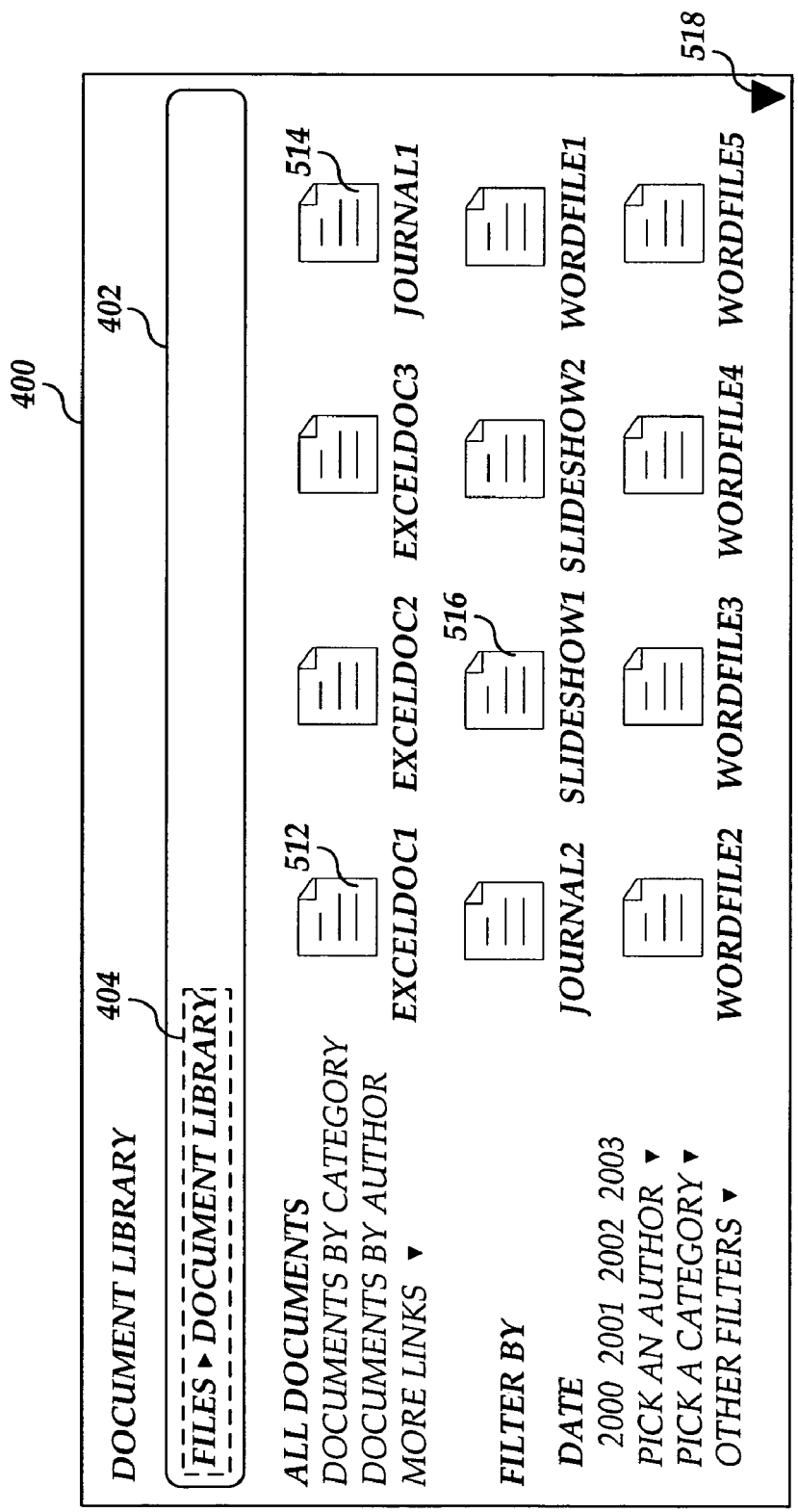
FIG. 5B is a pictorial diagram of the exemplary file viewer of FIG. 5A illustrating the results of selecting a segment of the virtual address in the virtual address bar.

FIG. 5B illustrates the results of selecting a segment 504 in the virtual address bar 402. By clicking on the segment 504 in the virtual address bar 402, the user is indicating a desire to navigate to that level in the virtual address. In effect, the user is trimming off those filters subsequent to the selected segment. For example, by clicking on segment 504 "Document Library" (FIG. 5A), the resulting virtual address 404 no longer contains segments 506 "Word Documents" and 508 "Author A" (FIG. 5A). Additionally, because the user has navigated to a less restrictive set of filters, the resulting virtual address 404 in the virtual address bar 402 is more inclusive. This is indicated by the addition of documents in the file viewer 400 of FIG. 5B not previously found in the file viewer 400 of FIG. 5A, including document 512, document 514, and document 516, and by the presence of a scroll button 518 indicating that additional files may be viewed that cannot be displayed in the file viewer 400 (FIG. 5B) due to space limitations.

Figure 5C:
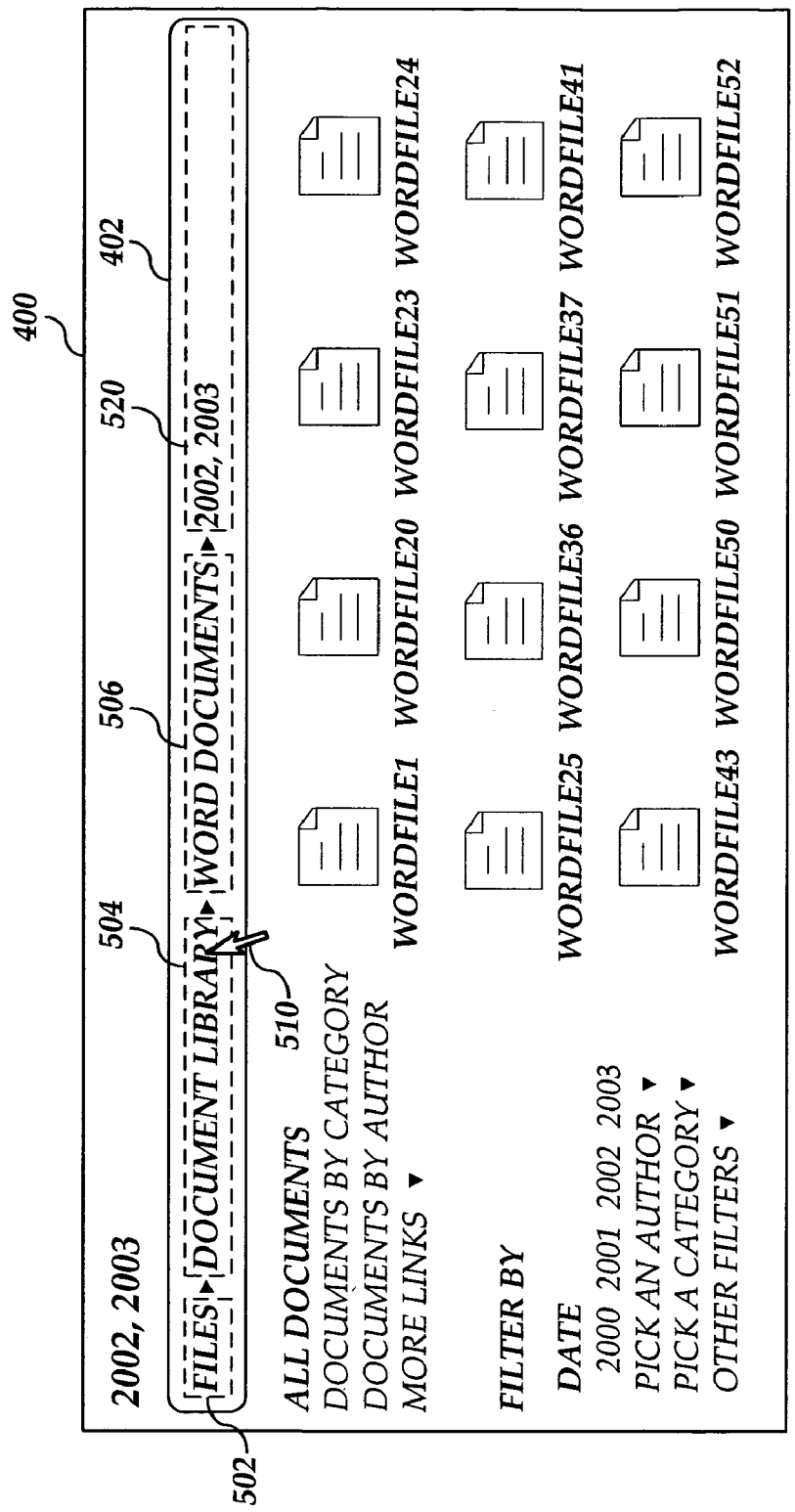
FIG. 5C is a pictorial diagram illustrating an exemplary file viewer for displaying files in a computer file system in which a segment of the virtual address includes more than one filter.

FIG. 5C is similar to FIG. 5A, but replaces segment 508 with segment 520. Segment 520 includes two filters or selection criteria, "2002" and "2003", which are logically combined to produce the results displayed in the file viewer 400. The "," between the two filters or selection criteria serves as a logical operand. It will be understood that Boolean operators such as AND, OR, NOT, NAND, NOR, XOR, etc. may be applied. In the present implementation, the "," serves as an "OR" operator so items which satisfy all the preceding filters or selection criteria (Files, Document Library, Word Documents) and which either were created in "2002" or were created in "2003" satisfy the logical expression and are presented in the file viewer 400. The two filters or selection criteria may identify items in virtual or physical locations. For example, one filter or selection criteria may identify items in a physical location, while the other may identify items in a virtual location. Any number of filters or selection criteria may be logically combined in a single segment, but for practical purposes, it would better to limit the number combined to a number which can be displayed together on the address bar to minimize user confusion. While logically combining filters or selection criteria across properties is within the scope of the invention, it would be preferable to logically combine filters or selection criteria within the same property for organizational purposes and to avoid potential user confusion.

It will be appreciated that a logical combination of filters or selection criteria may occur within one or more segments in the address bar. If a segment were added to succeed segment 520 in FIG. 5C, for example with filter "Author A", then the items displayed in the file viewer would be further narrowed to word documents created in "2002" or in "2003", which were authored by A. Selecting the segment Document Library from FIG. 5C results in the file viewer 400 shown in FIG. 5B, in which the segments "Word Documents" and "2002, 2003" have been removed and the files which meet the filter "Document Library" are presented.

In addition to selecting segments in a virtual address bar to navigate to a less restrictive segment, a user may also wish to navigate to, or select peer filters of current segments in a virtual address. A peer filter is an alternative filter that may be selected and applied to a given segment in the virtual address bar. For example, with reference to FIG. 5A, peer filters for segment 506 "Word Documents" may include filters such as "Excel Documents," "Journals," and the like. Other types of filters, including specific file system locations, hardware devices, or computer services, may also be applied to a given segment in the virtual address bar. Peer filters may or may not be logically related to a given segment's current filter. Each segment in a virtual address bar may have peer filters. Selecting a peer filter of a segment in a virtual address bar is sometimes referred to as navigating laterally. Selecting peer filters of segments in a virtual address bar is described below in regard to FIGS. 6A-6D, and also in regard to FIG. 10.

Figure 6A:
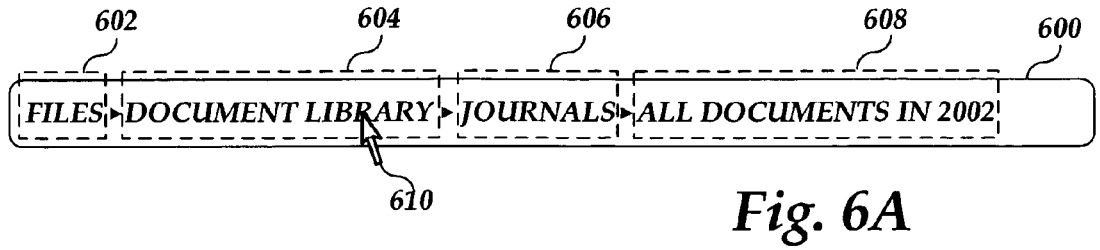
FIGS. 6A-6D are pictorial diagrams illustrating selecting a peer filter associated with a segment of a virtual address in a virtual address bar.

FIGS. 6A-6D are pictorial diagrams illustrating selecting a peer filter associated with a segment of virtual address in a virtual address bar 600. As shown in FIG. 6A, virtual address bar 600 has a virtual address comprising multiple segments, segments 602-608. In order to select a peer filter for a given interactive segment in a virtual address bar 600, a user must make an alternative selection, or alternative manipulation, of that interactive segment. One way to make an alternative selection is to right click on a given segment. Right clicking is known in the art and refers to using a secondary button on a mouse, or other input device, where the secondary button is typically on the right-hand side of the mouse. Alternatively, because an interactive segment can monitor when a cursor is located over it, an alternative selection may be made by locating the cursor over an interactive segment and leaving the cursor in place for predetermined amount of time, sometimes referred to as hovering. However, while the present discussion describes alternatives for causing peer filters to be displayed, they are for illustration, and should not be construed as limiting upon the present invention. Those skilled in the art will recognize that there are numerous alternatives for generating an alternative selection.

Figure 6B:
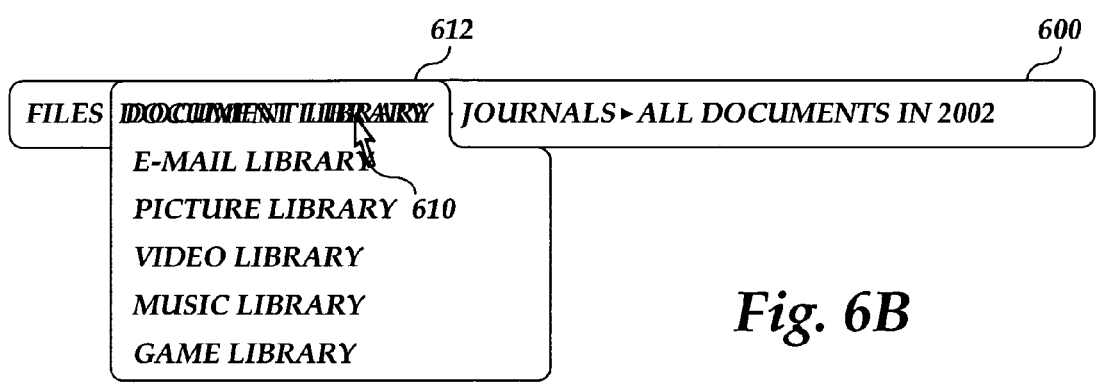

To illustrate alternatively selecting a segment, with reference to FIG. 6A, a user first places the cursor 610 over segment 604 "Document Library" for a predetermined amount of time, i.e., hovers over the segment, to select that segment. FIG. 6B demonstrates the results of alternatively selecting segment 604 "Document Library" in the virtual address bar 600. As shown in FIG. 6B, after alternatively selecting segment 604 "Document Library," a peer filter view 612 is displayed including peer filters corresponding to the selected segment. It should be understood that the peer filters presented in the peer filter view 612 are for illustrative purposes only, and should not be construed as limiting upon the present invention.

Figure 6C:
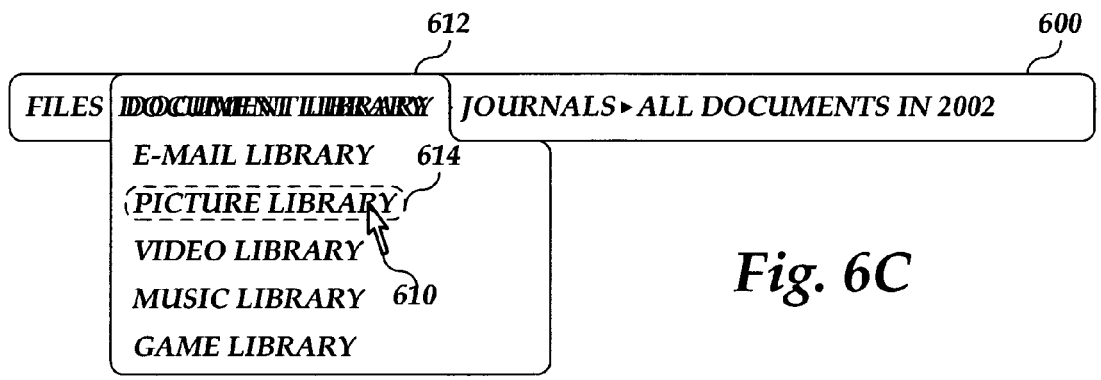
Figure 6D:

In order to select an alternative peer filter, as shown in FIG. 6C, the user positions the cursor 610 over one of the filters presented in the peer filter view 612, such as peer filter 614, and selects the peer filter. As shown in FIG. 6D, after selecting the alternative peer filter 614, the previously selected segment 604 (FIG. 6A) is replaced with a new segment 616 representing the selected alternative peer filter 614. Additionally, those segments that followed the alternatively selected segment 604 in the virtual address bar 600 of FIG. 6A, specifically segments 606 "Journals" and 608 "All Documents in 2002", are removed from the virtual address bar 600 in FIG. 6D. Although not shown, it follows that any files or content previously selected according to segments 604 "Document Library", 606 "Journals", and 608 "All Documents In 2002" would no longer be displayed in a corresponding file viewer, and only those files or content selected according to segments 602 "Files" and 616 "Picture Library" would be displayed.

In accordance with another aspect of the invention, a user may also wish to navigate to, or select, child filters or selection criteria of current segments in a virtual address. In a file tree structure, a parent node (or parent filter) has children represented by child nodes. Each child node is a child filter or selection criteria and further restricts the parent node or parent filter or selection criteria. Each segment in a virtual address bar may have child filters or selection criteria. In FIG. 5A, segment 504 is the child of segment 502. Selecting child filters or selection criteria of segments in a virtual address bar is described below in regard to FIGS. 13A-13D, and also in regard to FIG. 12.

Figure 13A:
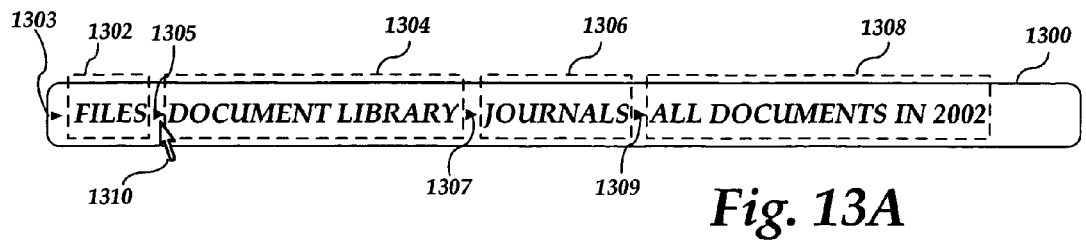
FIGS. 13A-13D are pictorial diagrams illustrating selecting a child filter associated with a segment of a virtual address in a virtual address bar.

FIGS. 13A-13D are pictorial diagrams illustrating selecting a child filter or selection criteria associated with a segment of virtual address in a virtual address bar 1300. As shown in FIG. 13A, virtual address bar 1300 has a virtual address comprising multiple segments, segments 1302-1308. In order to select a child filter or selection criteria for a given interactive segment in a virtual address bar 1300, a user may select a child control associated with the given interactive segments. Child controls 1303, 1305, 1307 and 1309 are associated with interactive segments 1302, 1304, 1306 and 1308, respectively. It will be appreciated that each segment and its associated child control may form a split button.

Figure 13B:
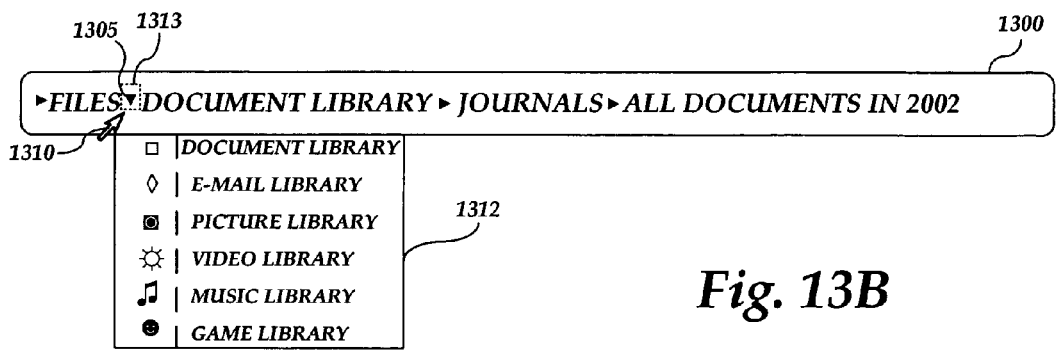

An example of selecting a child filter or selection criteria will be described in connection with FIGS. 13B-13D. To select a child filter or selection criteria, with reference to FIG. 13A, a user first places the cursor 1310 over the child control 1305 for a predetermined amount of time, i.e., hovers over the control, to select the child control. Other selection operations are possible as well such as selecting the control by performing a left click operation on the child control 1305. FIG. 13B demonstrates the results of selecting the child control 1305 associated with the segment "Files" in the virtual address bar 1300. As shown in FIG. 13B, after selecting the child control 1305, a child view 1312 is displayed including a list of child filters or selection criteria for the corresponding interactive segment 1302 and the corresponding icon for the child filter or selection criteria. The icon may identify a particular type for the child filter or selection criteria, such as whether it represents a virtual or physical location and the particular type of virtual or physical location. In this example of the child view, a split menu is shown with the icons in the left hand column and the child filters or selection criteria in the right hand column of the child view. It should be understood that the child filters or selection criteria presented in the child view 1312 and the icons are for illustrative purposes only, and should not be construed as limiting upon the present invention. Also, it should be appreciated that the icons may be displayed adjacent to any address type whether or not part of a child view, peer view or otherwise.

Figure 13C:
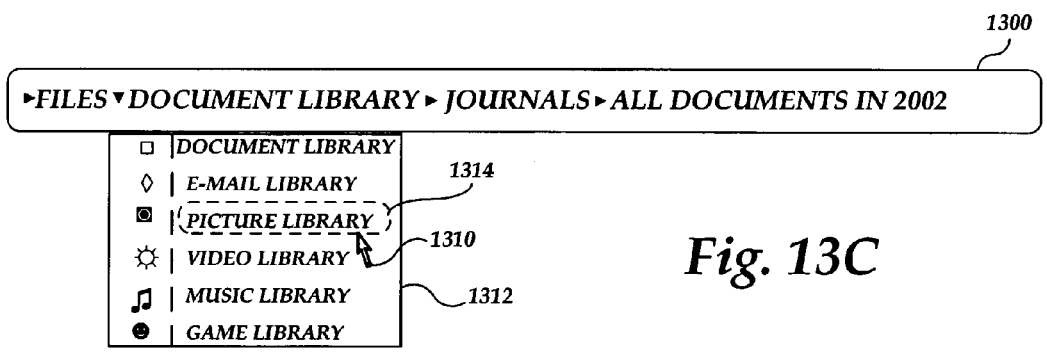
Figure 13D:

In order to select a child filter or selection criteria, as shown in FIG. 13C, the user positions the cursor 1310 over one of the child filters or selection criteria presented in the child view 1312, such as child filter or selection criteria 1314, and selects the child filter or selection criteria 1314. As shown in FIG. 13D, after selecting the child filter or selection criteria 1314, the segment 1304 succeeding the parent segment 1302 associated with the child control 1305 (FIG. 13A) is replaced with a new segment 1316 representing the selected child filter or selection criteria 1314. Additionally, those segments that followed the segment 1304 in the virtual address bar 1300 of FIG. 13A, specifically segments 1306 "Journals" and 1308 "All Documents in 2002", are removed from the virtual address bar 1300 in FIG. 13D. Although not shown, it follows that any files or content previously selected according to segments 1304 "Document Library", 1306 "Journals", and 1308 "All Documents In 2002" would no longer be displayed in a corresponding file viewer, and only those files or content selected according to segments 1302 "Files" and 1316 "Picture Library" would be displayed.

Segments may be added to a virtual address in a virtual address bar through various user interactions at the end of the existing segments. To add a filter to a virtual address in a virtual address bar, a user may manipulate an actionable control associated with a particular filter found on a window, or file viewer with the virtual address bar. For example, with reference to the file viewer 400 of FIG. 4, a user may click on the actionable control 412 "2003" to add a corresponding filter to the virtual address 404 in the virtual address bar 402. Alternatively (not shown), a user may manually enter in a known filter at the end of the virtual address by typing the filter's name. Numerous other ways of adding a filter to a virtual address exist, all of which are contemplated as falling within the scope of the present invention. Thus, it should be understood that the above examples are for illustration purposes, and should not be construed as limiting upon the present invention.

When a filter is added to a virtual address in a virtual address bar, a process is undertaken to ensure that the newly added filter does not conflict with any filters currently existing as part of the virtual address. If the newly added filter conflicts with an existing filter, the existing filter is removed. A newly added filter conflicts with an existing filter in a virtual address if the newly added filter varies from the breadth of the existing filter, being either more or less broad than the existing filter. Additionally, a newly added filter conflicts with an existing filter if the newly added filter is mutually exclusive to the existing filter. However, a newly added filter that is equivalent to an existing filter is not added because it has no effect. It should be understood that the above description of conflicts is given for illustration purposes, and should not be construed as limiting upon the present invention. Those skilled in the art will recognize that other conflicts between filters may exist that are contemplated as falling within the scope of the present invention.

Figure 7A:
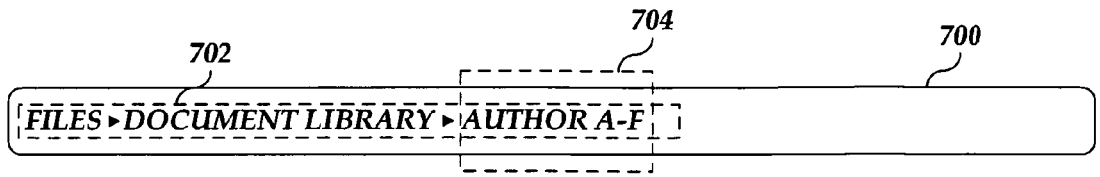
FIGS. 7A-7D are pictorial diagrams illustrating adding additional filters to a virtual address in a virtual address bar.
Figure 7B:
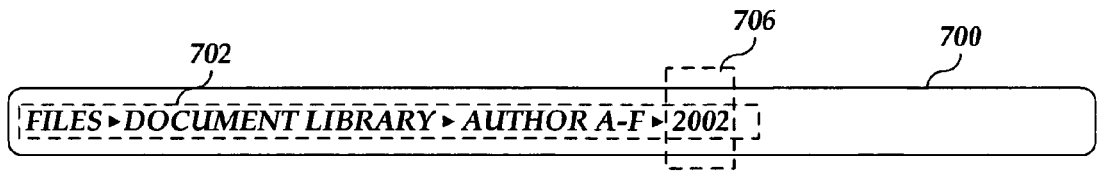

FIGS. 7A-7D are pictorial diagrams illustrating adding filters to a virtual address 702 in a virtual address bar 700, and removing conflicting existing filters. FIG. 7A illustrates an exemplary virtual address 702 displayed in a virtual address bar 700. As shown in FIG. 7B, a new filter, represented by segment 706 "2002", is added to the virtual address 702. As previously described, new filters are added to the end of the virtual address, as indicated by placing segment 706 "2002" at the end of the segments in the virtual address bar 700 of FIG. 7B. Thereafter, the process undertaken for adding segment 706 "2002" determines that the added filter does not conflict with any current filters in the virtual address 702. Thus, no existing filters are removed from the virtual address 702.

Figure 7C:
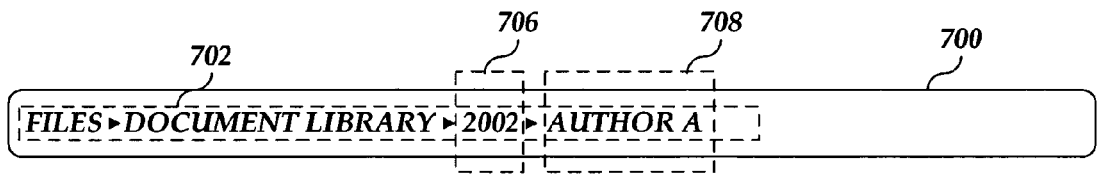

As shown in FIG. 7C, another filter is added to the virtual address 702, represented by segment 708 "Author A." The process undertaken for adding this new filter determines that the new filter, "Author A," would conflict with the filter represented by segment 704 "Author A-F" because the new filter, "Author A," is narrower than the existing filter. Accordingly, segment 704 "Author A-F" is removed from the virtual address bar 700, and segment 708 "Author A" is added to the end of the segments in the virtual address bar.

Figure 7D:
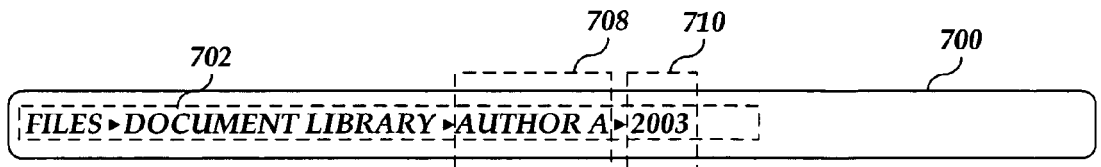

FIG. 7D illustrates the results of adding segment 710 "2003" to the virtual address bar 700 of FIG. 7C. Filters in a virtual address 702 are restrictive, not cumulative. Each filter further restricts the selected content. Thus, mutually exclusive filters would prevent the virtual address 702 from selecting any files or content, and therefore, create a conflict. As illustrated in FIG. 7D, segment 706 "2002" (FIG. 7C) is removed from the virtual address bar 700 because of a conflict as it is mutually exclusive with the newly added segment 710 "2003."

Figure 8A:
FIGS. 8A and 8B are pictorial diagrams illustrating an exemplary virtual address bar displaying a virtual address where the virtual address exceeds the virtual address bar's display capacity.
Figure 8B:

When a virtual address bar, such as virtual address bar 800 (FIG. 8A), cannot completely display the virtual address due to size limitations of the virtual address bar, a portion of the virtual address is displayed according to the size of the virtual address bar. However, the undisplayed portions of the virtual address may still be accessed by the user. More specifically, the virtual address bar displays actionable visual indicators to scroll the virtual path within the virtual address bar. FIGS. 8A and 8B illustrate an exemplary virtual address bar 800 displaying a virtual address where the virtual address exceeds the virtual address bar's display capacity. As shown in FIGS. 8A and 8B, scroll icons 802 and 804 indicate the direction the virtual address bar 800 may scroll in order to display the previously undisplayed portions of the virtual address. However, while the illustrative diagrams demonstrate the use of scroll icons, it is for illustrative purposes only, and should not be construed as limiting on the present invention. Those skilled in the art will recognize that there are numerous other ways of scrolling the virtual address in a virtual address bar, all of which are contemplated as falling within the scope of the present invention.

Figure 8C:
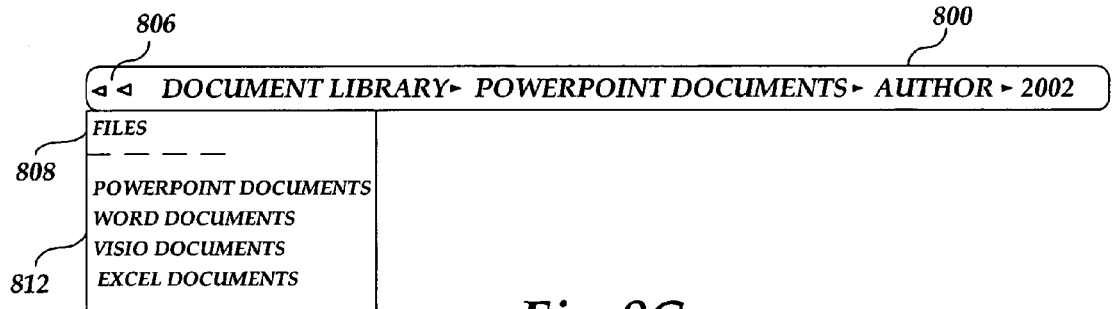
FIG. 8C is a pictorial diagram illustrating an exemplary virtual address bar displaying a virtual address in an overflow condition according to one aspect of the present invention.

According to another aspect, if an overflow condition occurs such that the address bar is too small to fit all the interactive segments that comprise the address, the interactive segments displayed are the most specific. For instance with reference to FIG. 8C, the broader interactive segment FILES is not included while the most specific interactive segments are displayed on the virtual address bar 800. The chevron 806 serves as an overflow indicator to indicate that the adjacent interactive segment DOCUMENT LIBRARY has ancestors that are not displayed. The chevron 806 has dual roles in that it also serves as a child control as well as an overflow indicator. As shown in FIG. 8C, the selection of the chevron 806 provides the child filter or selection criteria list including filters POWERPOINT DOCUMENTS, WORD DOCUMENTS, VISIO DOCUMENTS and EXCEL DOCUMENTS for the interactive segment DOCUMENT LIBRARY and also displays an ancestor list 808 for the interactive segment DOCUMENT LIBRARY including the ancestor FILES. Selection of an ancestor filter or child filter from the ancestor or child filter lists results in the address bar being modified to display that filter and remove all subsequent filters. It will be appreciated that the chevron 806 could serve as a control for displaying an ancestor list and an independent child control may exist.

Figure 9A:
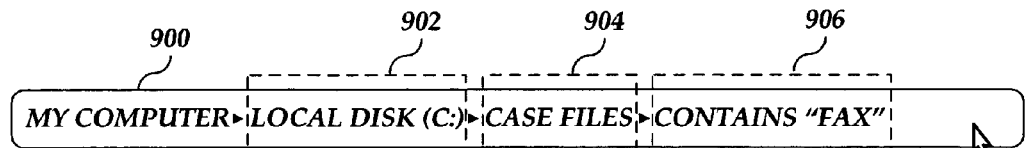
FIG. 9A is a pictorial diagram illustrating an exemplary virtual address bar having a virtual address with filters referencing both virtual and actual locations in a file system.

FIG. 9A is a block diagram illustrating a virtual address bar 900 having segments referencing both virtual and actual locations in a file system. As previously discussed, a virtual address in a virtual address bar 900 may contain segments referencing specific locations within a computer file system hierarchy, and also contain segments referencing virtual, or logical, locations within a computer file system. Files or content referenced by a virtual segment may be distributed among many physical locations. A virtual address bar 900 may contain segments referencing physical locations and segments referencing virtual locations. For example, virtual address bar 900 includes segment 902 "Local Disk (C:)" referring to files or content contained in a specific area in the computer file system, in particular drive "C." Alternatively, segment 904 "Case Files" of itself refers to files or content stored in multiple folders in the computer file system hierarchy associated with case files. However, in combination with segment 902 "Local Disk (C:)", segment 904 "Case Files" references only those case files found on local drive "C." Additionally, segment 906 "Contains 'Fax'" further filters the files on local disk C: and associated with the case files according to whether they contain the word "Fax."

Figure 9B:
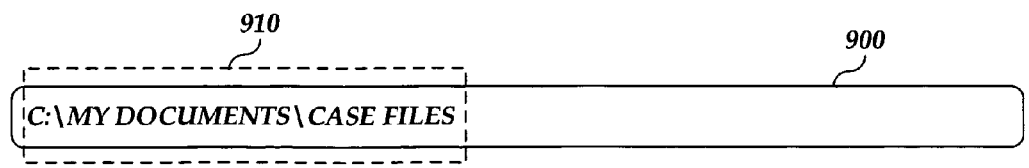
FIG. 9B is a pictorial diagram illustrating the exemplary virtual address bar of FIG. 9A as configured to display a conventional address bar.

As shown in FIG. 9B, a virtual address bar 900 may be configured to function as a conventional address bar. For example, with reference to FIG. 9A, by placing a cursor 908 in the empty space of the virtual address bar 900 and clicking there, the virtual address bar 900 switches from displaying segments representing a virtual address, to functioning as a conventional address bar displaying a conventional address 910, as shown in FIG. 9B. The conventional address 910 in the virtual address bar 900 of FIG. 9B approximates the virtual address displayed in the virtual address bar 900 of FIG. 9A. However, those filters in the virtual address bar 900 of FIG. 9A that do not correspond to physical locations in a computer file system cannot be displayed and are removed from the conventional address 910. Specifically, segment 904 "Case Files" and segment 906 "Contains 'Fax'" are not part of the conventional address 910 (FIG. 9B).

In order to reconfigure a virtual address bar 900, functioning as a conventional address bar, to function normally as a virtual address bar, the user must so indicate in a manner other than clicking on the empty area of the bar. When configured to function as a conventional address bar, a virtual address bar must permit the user to click in the empty area for address editing purposes. Clicking in the empty area of a conventional address bar places an editing cursor at the end of the address/ path for editing purposes. Accordingly, to reconfigure the virtual address to again function in its normal manner as described above, a user must press a predefined key or key sequence, such as the Esc or Tab key, or by place the focus on another area of a window or view by clicking on another area of the window or view. Those skilled in the art will recognize that other user actions may also be utilized to reconfigure the virtual address bar 900 to again function in its normal mode as described above, all of which are contemplated as falling within the scope of the present invention.

Figure 10:
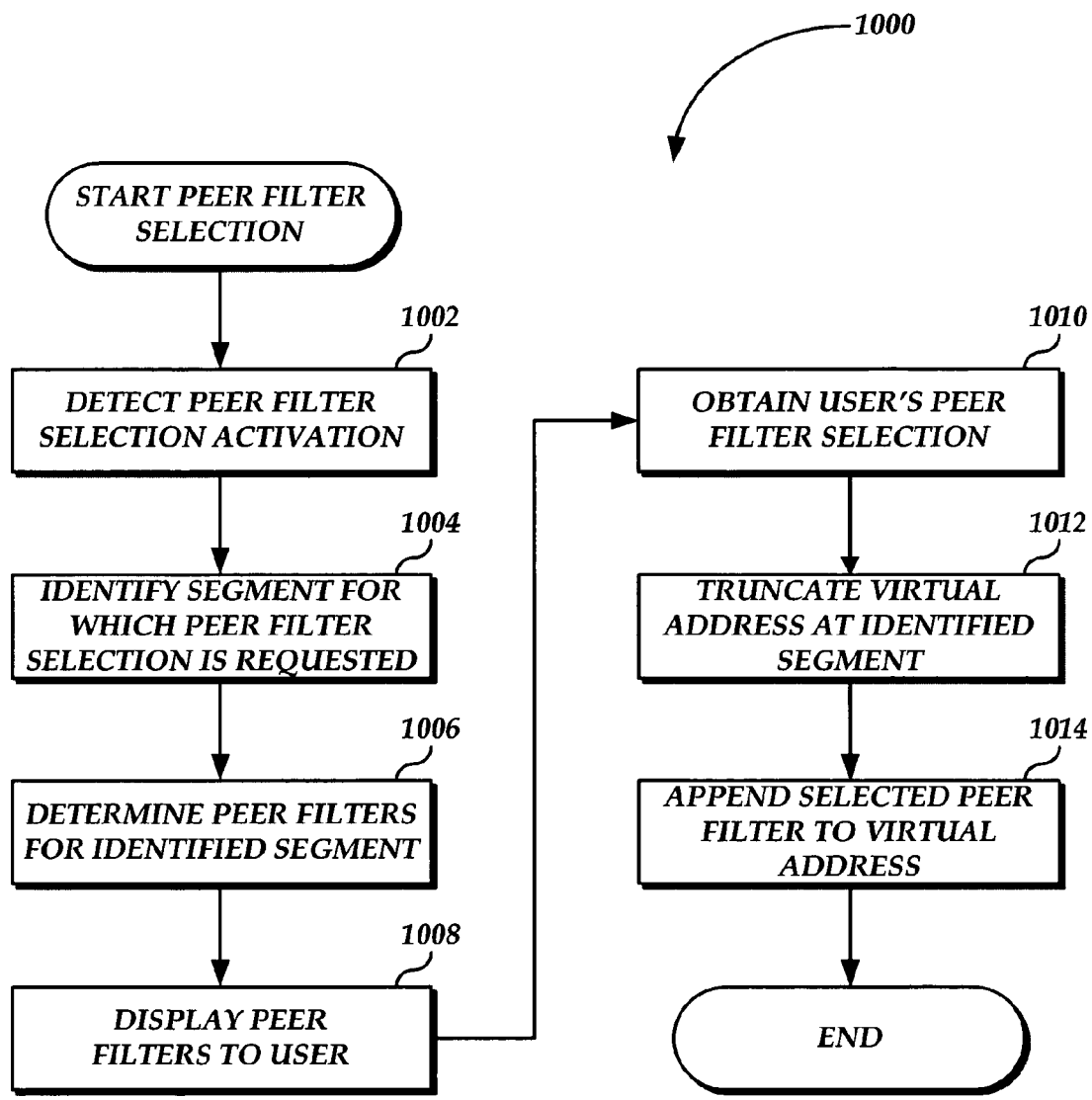
FIG. 10 is a flow diagram illustrative of an alternate filter selection routine for selecting alternate filters in a virtual address bar.

FIG. 10 is a flow diagram illustrative of a peer filter selection routine 1000 for selecting a peer filter for an identified segment in a virtual address bar. Beginning at block 1002, the routine 1000 detects a peer filter selection activation. Activating the peer filter selection process is described above in regard to FIGS. 6A-6D. At block 1004, the segment for which the peer filter selection has been requested is identified. At block 1006, the peer filters for the identified segment are determined from a predetermined list of peer filters. At block 1008, the peer filters are displayed to the user. At block 1010, the user's peer filter selection from peer filters displayed is obtained. At block 1012, the virtual address is truncated by removing the identified segment from the virtual address bar, and any additional segments that follow the identified segment. At block 1014, a segment representing the selected peer filter is appended to the remaining segments in the virtual address bar. Thereafter, the routine 1000 terminates.

Figure 11:
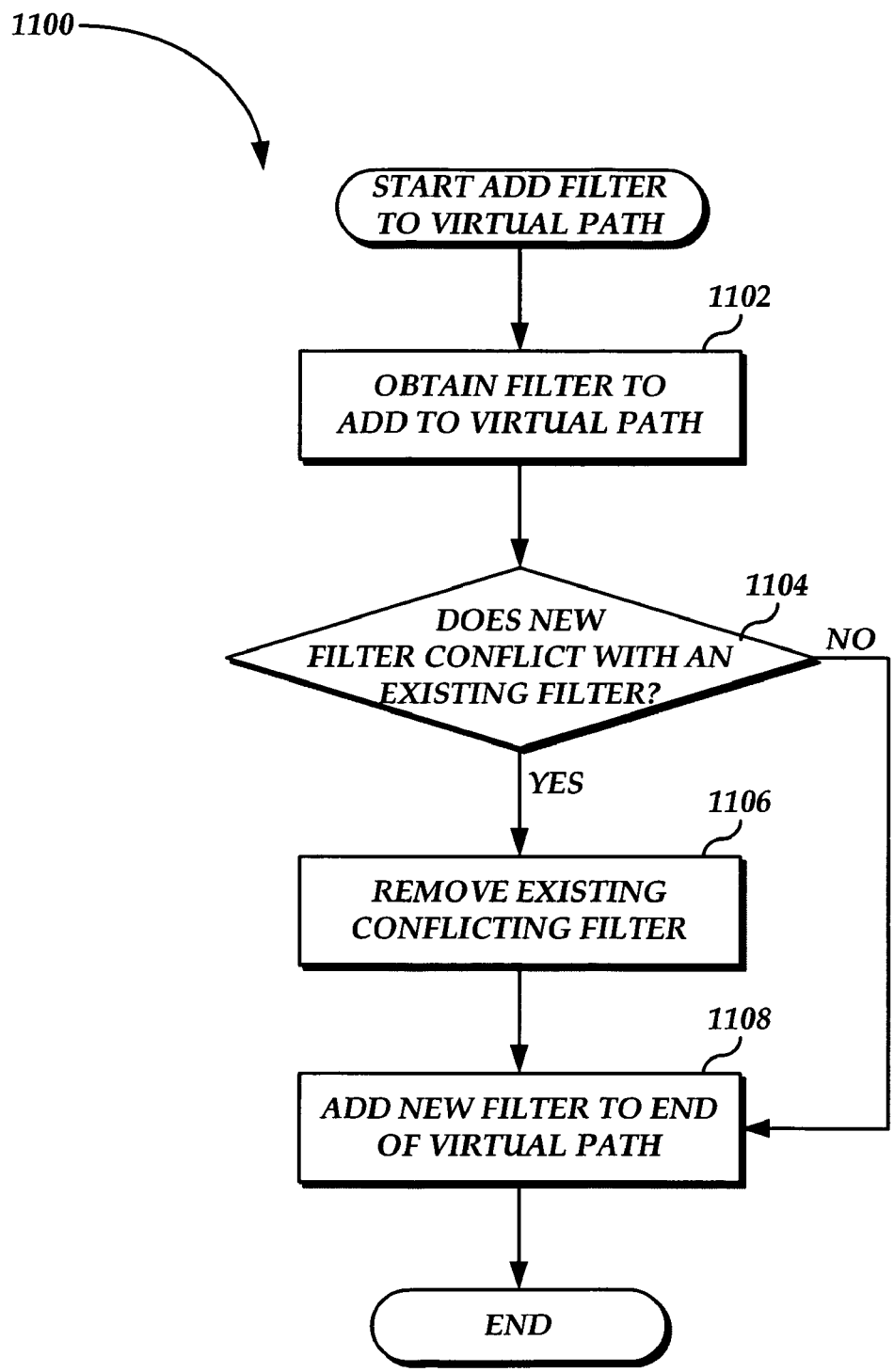
FIG. 11 is a flow diagram illustrating an illustrative add filter routine for adding a filter to a virtual address in a virtual address bar.

FIG. 11 is a flow diagram illustrating an exemplary add filter routine 1100 for adding a filter to a virtual address in a virtual address bar. Beginning at block 1102, the exemplary routine 1100 obtains the filter to be added to the virtual address. For example, as previously discussed in regard to FIG. 4, filters may be added to the virtual address according to user actions external to the virtual address bar, or alternatively, may be directly added to the virtual address bar by typing in the name of a predefined filter.

At block 1104, a determination is made whether the new filter conflicts with an existing filter already in the virtual address. As previously discussed in regard to FIGS. 7A-7D, a new filter may conflict with an existing filter by substantially narrowing or broadening the scope of the existing filter. Alternatively, a new filter may conflict with an existing filter because a new filter is mutually exclusive to an existing filter. If, at decision block 1104, the new filter conflicts with an existing filter, at block 1106, the existing filter is removed from the virtual address. Alternatively, at 1104, if the new filter does not conflict with an existing filter or, after removing the existing conflicting filter in block 1106, at block 1108, the new filter is added at the end of the virtual address. Thereafter, the exemplary routine 1100 terminates.

Figure 12:
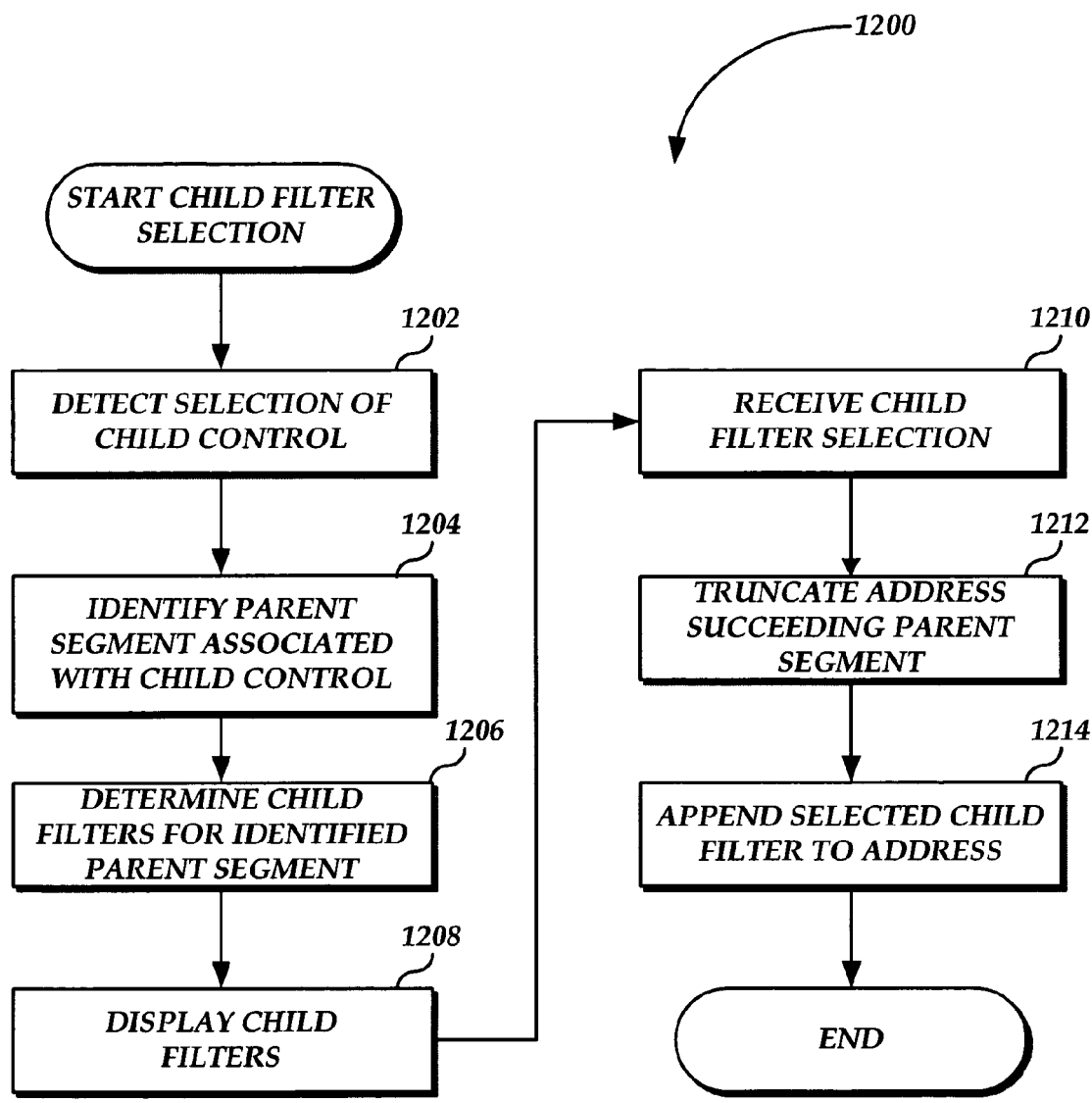
FIG. 12 is a flow diagram illustrative of a child filter selection routine for selecting child filters in a virtual address bar according to aspects of the present invention.

FIG. 12 is a flow diagram illustrative of a selection routine 1200 for selecting a child filter or selection criteria for an associated segment in a virtual address bar. Beginning at block 1202, the routine 1200 detects a selection of a child control. The child filter selection process is described above in regard to FIGS. 13A-13D. At block 1204, the parent segment associated with the selected child control is identified. At block 1206, the child filters for the identified parent segment are determined from a predetermined list of child filters. At block 1208, the child filters are displayed to the user. At block 1210, a child filter selection from the displayed child filters is received from the user. At block 1212, the virtual address is truncated by removing the segments succeeding the parent segment. At block 1214, a segment representing the selected child filter is appended to the remaining segments in the virtual address bar. Thereafter, the routine 1300 terminates.

While the preferred embodiments of the invention have been illustrated and described, it will be appreciated that various changes can be made therein without departing from the spirit and scope of the invention.

What is claimed is:

1. An address bar user interface control for selecting content accessible to a computer system for display, the address bar comprising:
   a plurality of interactive segments; a control associated with each of the plurality of interactive segments, the control being selectable to identify at least one additional selectable selection criteria for selecting file content stored in a virtual location not defined by a file system hierarchy; a list of selectable selection criteria, wherein selecting the control associated with an interactive segment causes the list of selectable selection criteria to be displayed; and wherein the plurality of interactive segments includes at least two selection criteria which are logically combined for selecting content for display.

2. The address bar user interface control of claim 1, further comprising an interactive segment corresponding to a selection criteria, wherein selecting the selection criteria from the list of selectable selection criteria causes the interactive segment corresponding to the selection criteria to be displayed succeeding at least one interactive segment.

3. The address bar user interface control of claim 2, wherein selecting the selection criteria from the list of selectable selection criteria further causes each interactive segment subsequent to at least one interactive segment to be removed from the address bar.

4. The address bar user interface control of claim 1, wherein if the interactive segment associated with the selection criteria has an immediate ancestor selection criteria and the immediate ancestor selection criteria is not displayed, selecting the control associated with the interactive segment further causes an ancestor list for the interactive segment to be displayed.

5. The address bar user interface control of claim 1, further comprising type identifiers associated with each of the selection criteria in the list of selectable selection criteria.

6. An address bar user interface control for selecting content accessible to a computer system for display, the address bar comprising:
   a first interactive segment including at least two selection criteria, including selection criteria for selecting file content stored in a virtual location, logically combined for selecting file content for display, wherein the virtual location is not defined by file-system hierarchy; a second interactive segment including at least one selection criteria, the second interactive segment preceding the first interactive segment wherein that at least two selection criteria of the first interactive segment further restart the file content selected by that at least one selection criteria of the second interactive segment; and a third interactive segment including at least one selection criteria succeeding the first interactive segment wherein selecting the first interactive segment in the address bar causes the third interactive segment to be removed from the address bar.

7. The address bar user interface control of claim 6, wherein the at least two selection criteria are logically combined according to a logical OR operation.

8. The address bar user interface control of claim 6, wherein at least one selection criteria includes selection criteria for selecting content stored in a physical location.

9. A computer-readable medium having computer-executable instructions stored thereon for performing the method comprising the steps of:
   displaying an address bar comprising a plurality of interactive segments, each interactive segment including at least one selection criteria for selecting file content to be displayed on a display device irrespective of the file content's location in a file system hierarchy, wherein the address bar selects content for display on a display device according to the at least one selection criteria of each of the plurality of interactive segments, and a control for a first interactive segment, the control being selectable to identify selectable selection criteria;
   detecting user actions on the address bar; and
   upon detecting a user action on the address bar, updating the address bar according to the detected user action; and wherein the detected user action is a selection of the control, and wherein updating the address bar according to the detected user action comprises displaying a list of selectable selection criteria in response to selection of the control.

10. The computer-readable medium of claim 9, wherein the detected user action is a selection of the control, and wherein updating the address bar according to the detected user action comprises displaying a list of selectable selection criteria in response to selection of the control.

11. The computer-readable medium of claim 9, further comprising causing a second interactive segment corresponding to a selection criteria to be displayed succeeding the first interactive segment in response to a user selection of the selection criteria.

12. The computer-readable medium of claim 11, further comprising causing each interactive segment subsequent to at least one interactive segment to be removed from the address bar in response to the user selection of the selection criteria.

13. The computer-readable medium of claim 9, wherein displaying further comprises displaying a second interactive segment including at least two selection criteria which are logically combined for selecting content for display.

14. The computer-readable medium of claim 9, wherein the at least two selection criteria are logically combined by applying a logical OR operation.

* * * * *